United States Patent
Farley et al.

(10) Patent No.: US 12,326,930 B2
(45) Date of Patent: Jun. 10, 2025

(54) METHOD AND SYSTEM FOR MICROVISOR HIDING

(71) Applicant: Dell Products L.P., Round Rock, TX (US)

(72) Inventors: Douglas L. Farley, Round Rock, TX (US); Srinivas Giri Raju Gowda, Fremont, CA (US); David Craig Lawson, Richardson, TX (US); Shawn Mathew Swanson, Chanhassen, MN (US)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 18/459,637

(22) Filed: Sep. 1, 2023

(65) Prior Publication Data

US 2025/0077653 A1   Mar. 6, 2025

(51) Int. Cl.
*G06F 21/55* (2013.01)
*G06F 9/54* (2006.01)

(52) U.S. Cl.
CPC .............. *G06F 21/552* (2013.01); *G06F 9/54* (2013.01); *G06F 2221/034* (2013.01)

(58) Field of Classification Search
CPC .............. G06F 21/55–554; G06F 9/54; G06F 2221/034
See application file for complete search history.

(56) References Cited

U.S. PATENT DOCUMENTS

| | | | | |
|---|---|---|---|---|
| 9,292,686 | B2* | 3/2016 | Ismael | G06F 9/5027 |
| 10,848,418 | B1* | 11/2020 | Allen | H04L 45/60 |
| 2010/0082783 | A1* | 4/2010 | Kohn | G06F 9/4416 709/222 |
| 2013/0290694 | A1* | 10/2013 | Civilini | H04L 41/0806 713/2 |
| 2015/0039871 | A1* | 2/2015 | Shetty | G06F 9/5011 713/1 |
| 2015/0199513 | A1* | 7/2015 | Ismael | G06F 9/45558 726/22 |
| 2015/0199531 | A1* | 7/2015 | Ismael | G06F 21/53 726/30 |
| 2015/0199532 | A1* | 7/2015 | Ismael | G06F 21/552 726/30 |
| 2016/0004869 | A1* | 1/2016 | Ismael | G06F 21/577 726/1 |
| 2016/0006756 | A1* | 1/2016 | Ismael | H04L 63/1441 726/22 |

* cited by examiner

*Primary Examiner* — Jonathan A Bui
(74) *Attorney, Agent, or Firm* — Chamberlain, Hrdlicka, White, Williams & Aughtry; Aly Z. Dossa

(57) ABSTRACT

A method for managing a microvisor includes: issuing an API call to a microvisor agent to obtain a configuration template (CT) required to provision an LCS on an IHS; upon obtaining the CT, sending the CT to a microvisor kernel via the microvisor API; provisioning the LCS based on the CT; upon provisioning of the LCS and based on the microvisor kernel's request, initiating a guest BIOS of the LCS; notifying, via a GUI, an administrator about the provisioned LCS; after notifying the administrator: monitoring communication traffic of the LCS; analyzing the communication traffic to generate an analysis output; making, based on the analysis output, a determination that the activity is a malicious activity; and implementing, based on the determination, a security policy to disrupt a malicious user of the LCS.

20 Claims, 7 Drawing Sheets

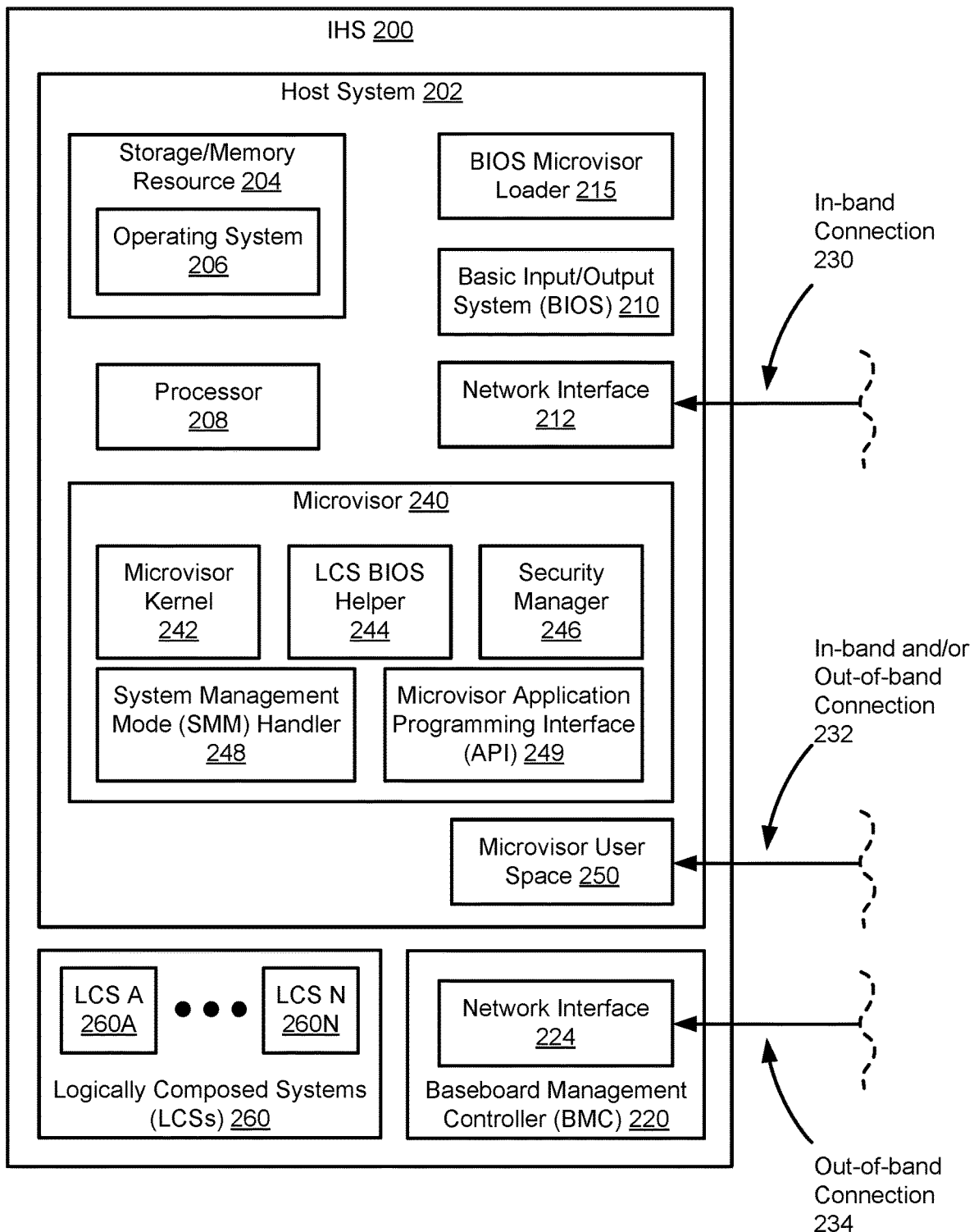
FIG. 2.1

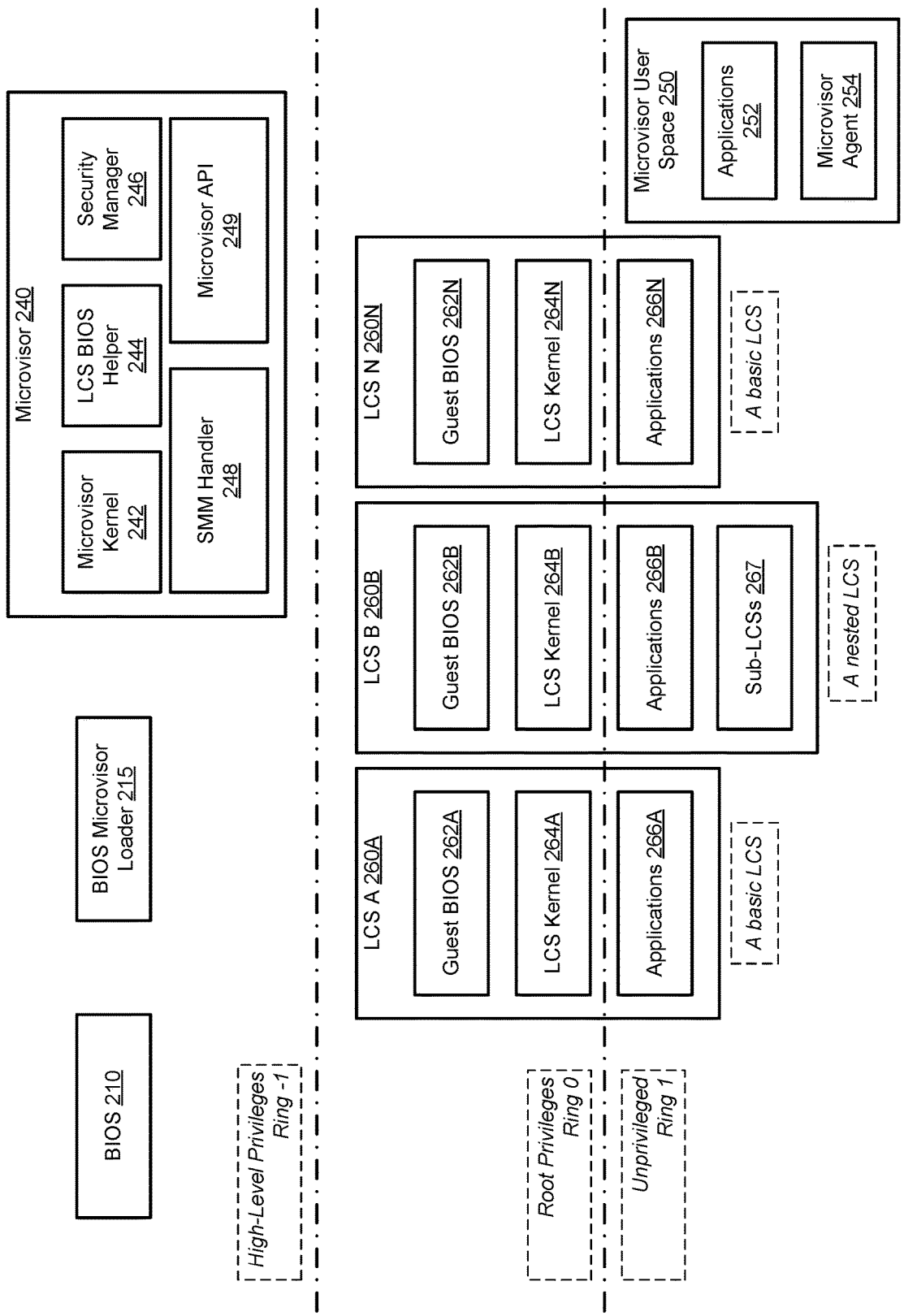
FIG. 2.2

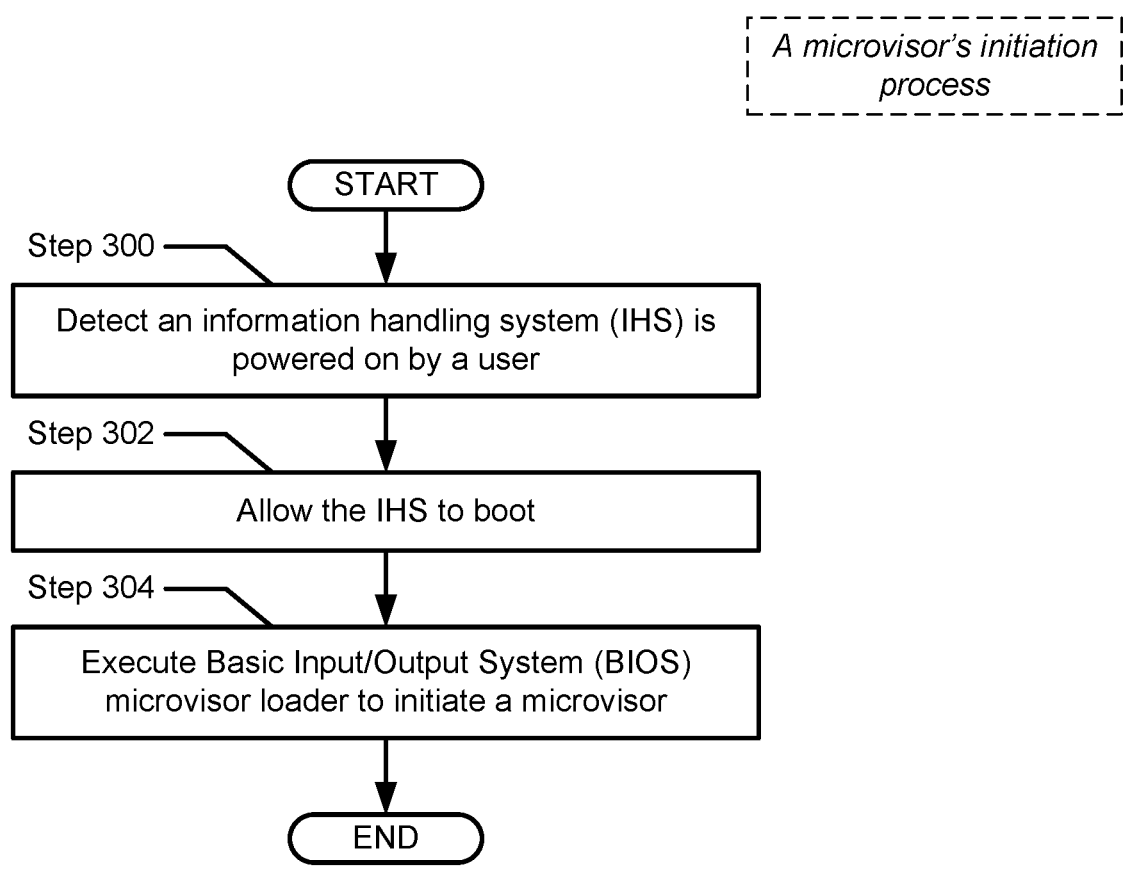
FIG. 3.1

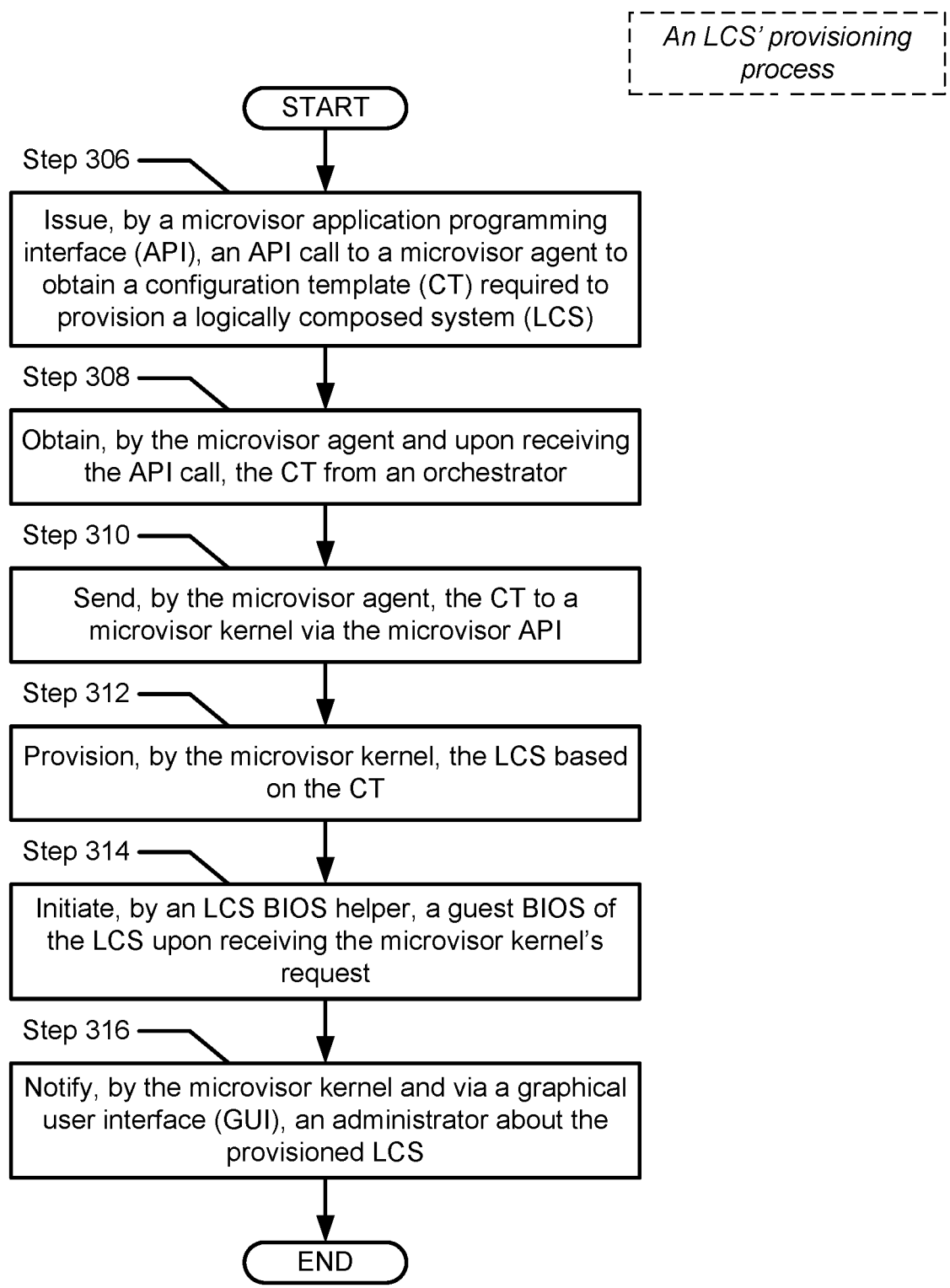
FIG. 3.2

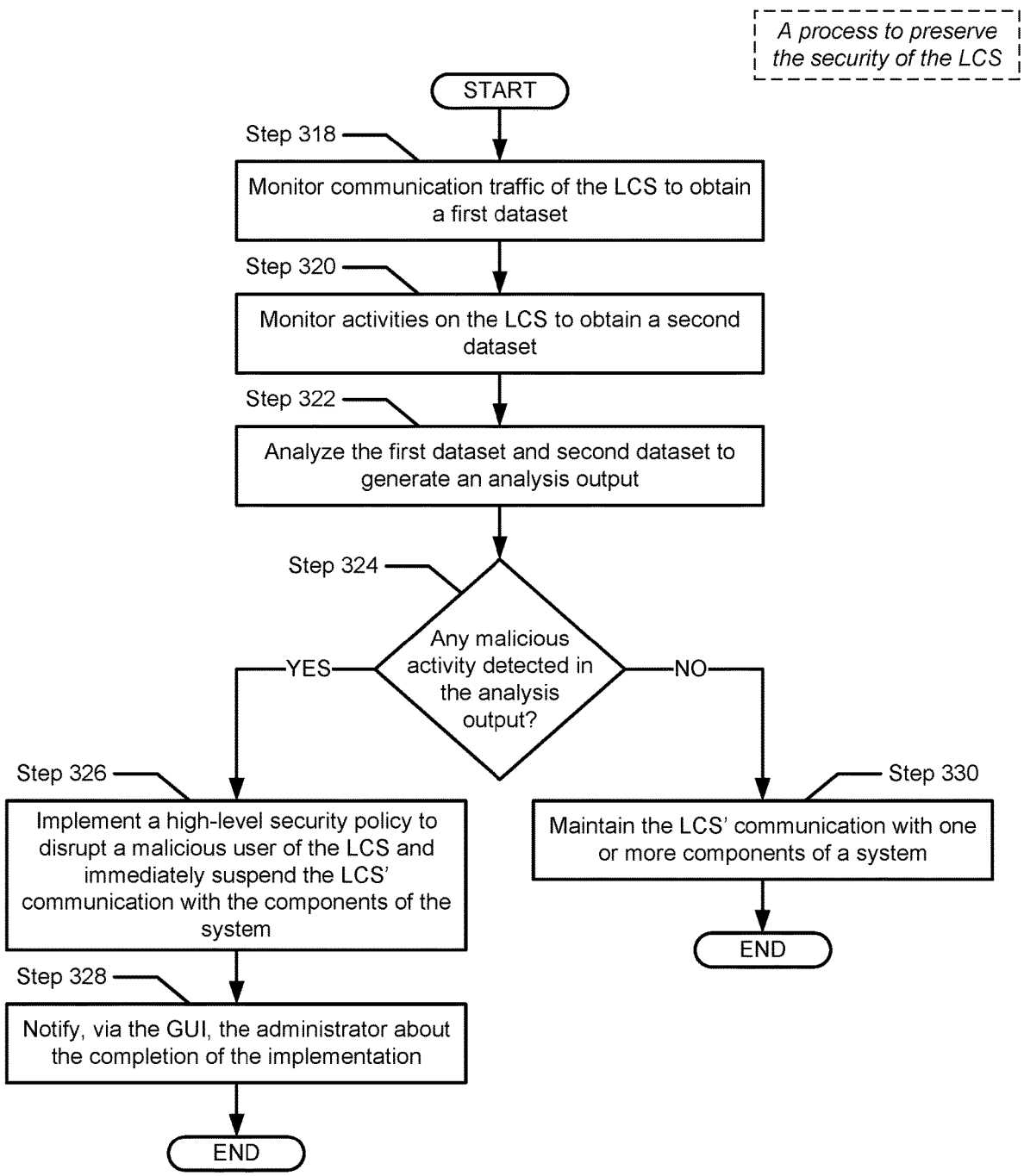
FIG. 3.3

METHOD AND SYSTEM FOR MICROVISOR HIDING

BACKGROUND

As the value and use of information continues to increase, individuals and businesses seek additional ways to process and store information. One option available to users (e.g., administrators) is information handling systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow IHSs to be general or configured for a specific user or a specific use such as financial transaction processing, airline ticket reservations, enterprise data storage, or global communications. Further, IHSs may include a variety of hardware and software components that may be configured to process, store, and communicate information and may include one or more computer systems, graphics interface systems, data storage systems, networking systems, and mobile communication systems. IHSs may also implement various virtualized architectures. Data and voice communications among IHSs may be via networks that are wired, wireless, or some combination.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 2.1 shows a diagram of an IHS in accordance with one or more embodiments of the invention.

FIG. 2.2 shows a ring-level diagram of IHS components in accordance with one or more embodiments of the invention.

FIG. 3.1 shows a microvisor's initiation process in accordance with one or more embodiments of the invention.

FIG. 3.2 shows a logically composed system's (LCS) provisioning process in accordance with one or more embodiments of the invention.

FIG. 3.3 shows a process to preserve the security of an LCS in accordance with one or more embodiments of the invention.

DETAILED DESCRIPTION

Figure 1:
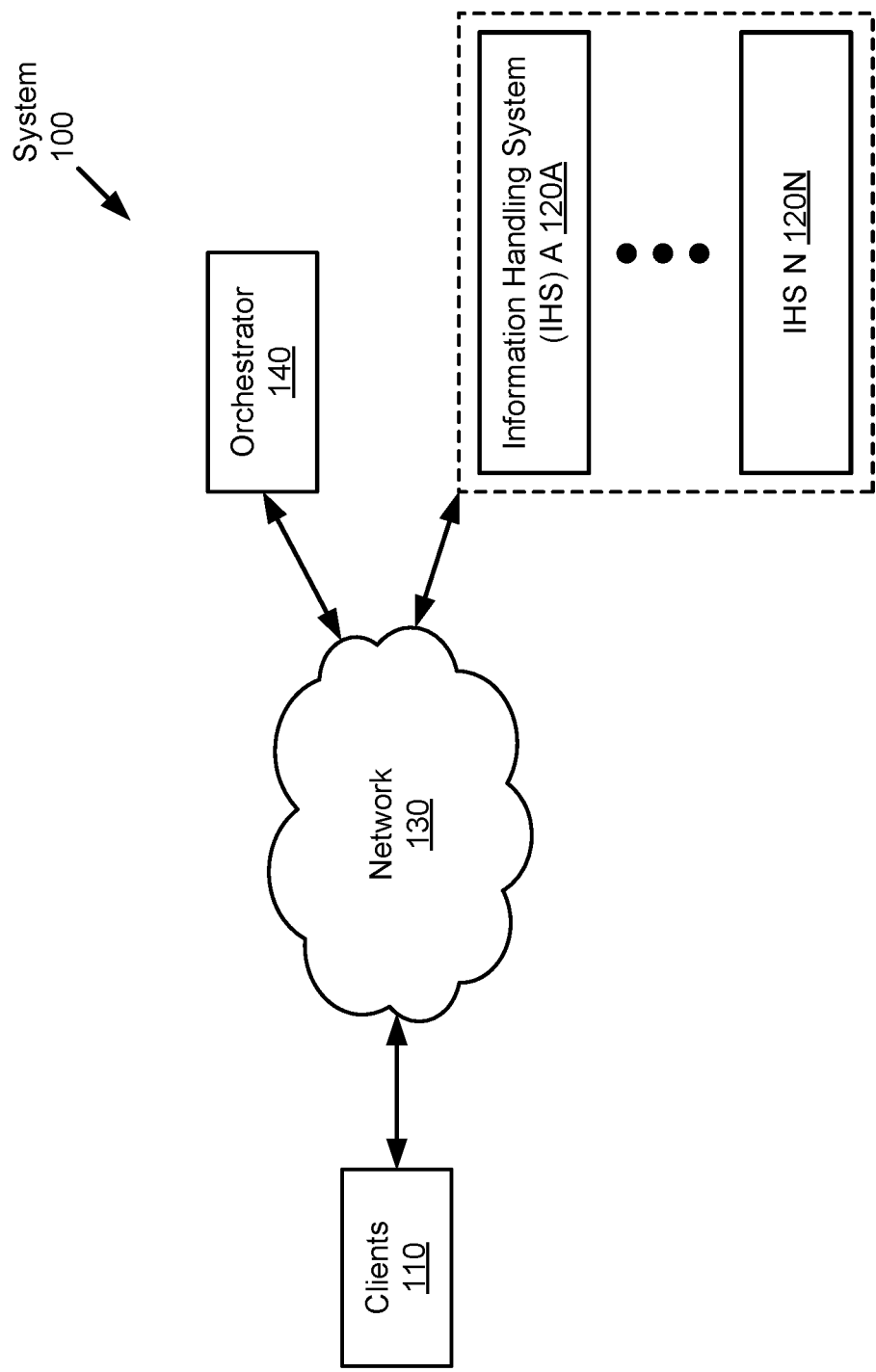
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, typical basic input/output system (BIOS) does not provide a rich (e.g., a multi-functional, a multi-tenant, etc.) control plane (e.g., an attribute-based access control (ABAC) like control plane) with a continued fine-grained resource control (e.g., a fine-grained access control that allows or denies requests to use assets, such as data, metadata, and resources, based on multiple conditions or entitlements) during runtime to enforce one or more service level agreement (SLA) and/or quality of service (QOS) "compliance" requirements/constraints. For example, in a traditional x86 architecture (which provides a coarse-grained resource control), a physical resource may be assigned directly to a guest (e.g., a guest device, a tenant, an instance of a tenant, etc.) or the physical resource may first become virtualized and then a portion of the virtualized resource may be assigned to a guest, which is actually not a way to take existing resources and split those resources between multiple subtenants in a fine-grained manner.

In some cases, tenants may not under any obligation (e.g., may not operate based on a specific asset access policy) and may not be trusted to share assets in a typical x86 architecture. For example, after having access to a particular asset in an environment, a user may peruse other assets within the environment for malicious purposes (e.g., data hijacking). Further, in traditional composable disaggregated infrastructures (CDIs), underutilization of hardware (i.e., physical) and/or software (i.e., logical) resources is a common issue. For example, 15% of hardware resources (e.g., processor cores, memory, storage, etc.) of a single IHS is assigned to Tenant R; however, Tenant R is only using 50% of the assigned hardware resources to perform production workloads and the remaining portion of the assigned hardware resources are trapped (e.g., not usable by other users who desperately need additional resources for their production workloads).

Moreover, current firmware management of multitenancy boundaries (e.g., in a traditional x86 architecture) may not adequately hide resources (e.g., local resources) in an environment and/or one or more tenants that are operating on the environment may not be alone, which may lead to contention and misunderstanding around shared resources.

For at least the reasons discussed above and without requiring resource (e.g., time, engineering, etc.) intensive efforts, a fundamentally different approach is needed. Embodiments of the invention relate to methods and systems to manage a microvisor and one or more LCSs. More specifically, the embodiments of the invention may first issue, by a microvisor application programming interface (API), an API call to a microvisor agent to obtain a configuration template (CT) required to provision an LCS on a first IHS. Upon obtaining the CT, the microvisor agent may send the CT to a microvisor kernel via the microvisor API. Thereafter, the microvisor kernel may provision the LCS based on the CT. Upon provisioning of the LCS and based on the microvisor kernel's request, an LCS basic input/output system (BIOS) helper may initiate a guest BIOS of the LCS, in which the microvisor kernel may then notify, via a graphical user interface (GUI), an administrator about the provisioned LCS.

After notifying the administrator, a security manager (i) may monitor communication traffic of the LCS to obtain a first dataset and (ii) may monitor an activity performed on the LCS to obtain a second dataset. The security manager may then analyze the first dataset and second dataset to generate an analysis output. Based on the analysis output, the security manager may make a determination that the activity is a malicious activity. Finally, based on the determination, the security manager may implement a high-level security policy to disrupt a malicious user of the LCS.

As a result of the processes discussed below, one or more embodiments disclosed herein advantageously ensure that: (i) trapped or starved resources that are otherwise inaccessible through traditional models/approaches are made available via a better resource distribution/orchestration/placement among multiple IHSs, (ii) existing resources between multiple subtenants are divided in a fine-grained manner (e.g., keeping Tenant A and Tenant B separate and unaware of each other while providing the required resources to them simultaneously without contention around shared access), (iii) SLA and QoS constraints (e.g., contractual objectives) are enforced on shared resources (e.g., of multiple IHSs (e.g., a collection of nodes)) to prevent contention around shared access (e.g., resource consumption requests) to those resources (e.g., cache, network interfaces, etc.) so that, for example, during times of a peak load, Tenant X gets a priority and a preference to the resources over Tenant Y (because Tenant X has the priority specified in the SLA and QoS constraints), (iv) any asset that is access-prohibited for a specific user is hidden from that user for access, (v) a better overall composition of resources is provided in order to (a) unlock trapped resources (e.g., providing a better aggregate resource utilization across disaggregated resources of IHSs) and (b) provide a better user experience for a user, (vi) a layer of multitenancy support in a system is provided in order to generate multitenancy boundaries around system resources from a firmware perspective, (vii) multitenant management and enforcement for sharing physical and/or logical resources within a single IHS (e.g., provisioning access to tenants and specifying what resources those tenants have access to through policies) are provided by implementing a microvisor (e.g., a lower level, runtime lightweight hypervisor comparing to heavier hypervisors that are not intended to solve the particular problem of multitenancy), (viii) generation of per-workload vendor certified platforms of heterogonous composed infrastructure is allowed in a repeatable and prescriptive way across generations to provide a better user experience. (ix) a microvisor of an IHS appears indistinguishable from a BIOS of the IHS to an incumbent user, (x) for a composed system, a common method of representing application and workload runtime of what are disaggregated and heterogonous backing physical resources, (xi) based on extracted insights, administrators identify a user profile of a user more in-depth in order to provide a better user experience to the user, (xii) based on extracted insights, identify a device profile (e.g., a device state, a resource state, etc.) of an LCS, and/or (viii) based on extracted insights, administrators invest most of their time and engineering efforts to efficiently enhance resilience of, at least, IHSs and LCSs.

The following describes various embodiments of the invention.

FIG. 1 shows a diagram of a system (100) in accordance with one or more embodiments of the invention. The system (100) includes any number of clients (110), an orchestrator (140), any number of IHSs (e.g., IHS A (120A), IHS B (120B), etc.), and a network (130). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (110), the orchestrator (140), and the IHSs (e.g., 120A, 120B, etc.) may be physical or logical devices, as discussed below. While FIG. 1 shows a specific configuration of the system (100), other configurations may be used without departing from the scope of the invention. For example, although the clients (110) and the IHSs (e.g., 120A, 120B, etc.) are shown to be operatively connected through a communication network (e.g., 130), the clients (110) and the IHSs (e.g., 120A, 120B, etc.) may be directly connected (e.g., without an intervening communication network). As yet another example, although the orchestrator (140) and the IHSs (e.g., 120A, 120B, etc.) are shown to be operatively connected through a communication network (e.g., 130), the orchestrator (140) and the IHSs (e.g., 120A, 120B, etc.) may be directly connected.

Further, the functioning of the clients (110) and the IHSs (e.g., 120A, 120B, etc.) is not dependent upon the functioning and/or existence of the other components (e.g., devices) in the system (100). Rather, the clients (110) and the IHSs (e.g., 120A, 120B, etc.) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may represent a distributed system (e.g., a distributed computing environment, a cloud computing infrastructure, etc.) that delivers at least computing power (e.g., real-time network monitoring, server virtualization, etc.), storage capacity (e.g., data backup), and data protection (e.g., software-defined data protection, disaster recovery, etc.) as a service to users (e.g., end-users) of the clients (110). The system (100) may also represent a comprehensive middleware layer running on computing devices (e.g., 400, FIG. 4) that supports virtualized application environments. In one or more embodiments, the system (100) may support a virtual machine (VM) environment, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide the aforementioned computer-implemented services to the users, the system (100) may perform some computations (e.g., data collection, distributed processing of collected data, etc.) locally (e.g., at the users' site using the clients (110)) and other computations remotely (e.g., away from the users' site using the environments (e.g., 120A, 120B, etc.)) from the users. By doing so, the users may utilize different computing devices (e.g., 400, FIG. 4) that have different quantities of computing resources (e.g., processing cycles, memory, storage, etc.) while still being afforded a consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a data center (not shown) may be configured for hosting the IHSs (e.g., 120A, 120B, etc.) and maintaining various workloads, and/or for providing a computing environment (e.g., computing power and storage) whereon workloads may be implemented (to provide computer-implemented services). As being implemented as a physical computing device or a logical computing device and with the help of the hosted IHSs, a data center may include functionality to, e.g.: (i) provide software-defined data protection, (ii) provide automated data discovery, protection, management, and recovery operations in on-premises, (iii) provide data deduplication, (iv) orchestrate data protection (e.g., centralized data protection, self-service data protection, etc.) through one or more GUIs, (v) empower data owners (e.g., users of the clients (110)) to perform self-service data backup and restore operations from their native applications, (vi) ensure compliance and satisfy different types of service level objectives (SLOs), (vii) enable virtualized and cloud deployments, including automated data discovery, protection, management, and recovery operations for in-cloud workloads, (viii) enable data discovery, protection, management, and recovery operations for cloud-native workloads (e.g., an application that was designed to reside in a cloud environment) across multiple cloud environments, (ix) simplify VM image backups of a VM with near-zero impact on the VM, (x) streamline data protection for applications and/or containers, (xi) increase resiliency of an organization by enabling rapid recovery or cloud disaster recovery from cyber incidents, (xii) provide long-term data retention, (xiii) provide dynamic network-attached storage (NAS) backup and recovery, (xiv) provide operational simplicity, agility, and flexibility for physical, virtual, and cloud-native IT environments, (xv) support an infrastructure that is based on a network of computing and storage resources that enable the delivery of shared applications and data (e.g., a data center may exchange data with other data centers of the same organization registered in/to the network (130) in order to, for example, participate in a collaborative workload placement; the data center may split up a request (e.g., an operation, a task, an activity, etc.) with another data center, coordinating its efforts to complete the request (e.g., to generate a response) more efficiently than if the data center had been responsible for completing the request; etc.), (xvi) consolidate multiple data process or protection requests (received from, for example, the clients (110)) so that duplicative operations (which may not be useful for restoration purposes) are not generated, and (xix) initiate multiple data process or protection operations in parallel (e.g., an engine (of a data center) may host multiple operations, in which each of the multiple operations may (a) manage the initiation of a respective operation and (b) operate concurrently to initiate multiple operations).

In one or more embodiments, a data center may be capable of providing a range of functionalities/services to the users of the clients (110). However, not all of the users may be allowed to receive all of the services. To manage the services provided to the users of the clients (110), a system (e.g., a service manager) in accordance with embodiments of the invention may manage the operation of a network (e.g., 130), in which the clients (110) are operably connected to the data center. Specifically, the service manager (i) may identify services to be provided by the data center (for example, based on the number of users using the clients (110)) and (ii) may limit communications of the clients (110) to receive data center provided services.

For example, the priority (e.g., the user access level) of a user may be used to determine how to manage computing resources (e.g., of the IHSs (e.g., 120A, 120B, etc.)) within the data center to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a user with a user access level/tier of 4/10). In such a scenario, the user level of that user may indicate that certain ports (of the subcomponents of the network (130) corresponding to communication protocols such as transmission control protocol (TCP), user datagram protocol (UDP), etc.) are to be opened, other ports are to be blocked/disabled so that (i) certain services are to be provided to the user by the data center (e.g., while the computing resources of the IHSs (e.g., 120A, 120B, etc.) may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (110) may be granularly configured without modifying the operation(s) of the clients (110) and (ii) the overhead for managing the services of the clients (110) may be reduced by not requiring modification of the operation(s) of the clients (110) directly.

In contrast, a second user may be determined to be a high priority user (e.g., a user with a user access level of 9/10). In such a case, the user level of that user may indicate that more ports are to be opened than were for the first user so that (i) the data center may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of an SLA (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor (e.g., a manufacturer, a trusted third-party vendor, etc.) and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements (e.g., if the RPO is set to 1-hour, the corresponding backup operation should be performed again within 1-hour after the start time of the last backup operation of an object), recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the portion of a central processing unit (CPU), memory, and a disk that those processes have access to.

As used herein, a "file system" is a method that an OS (e.g., Microsoft® Windows, Apple® MacOS, etc.) uses to control how data is named, stored, and retrieved. For example, once a user has logged into a computing device (e.g., 400, FIG. 4), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

In one or more embodiments, an IHS (e.g., 120A, 120B, etc.) may include (i) a chassis (e.g., a mechanical structure, a rack mountable enclosure, etc.) configured to house one or more servers (or blades) and their components (see, e.g., FIG. 2.1) and (ii) any instrumentality or aggregate of instrumentalities operable to compute, classify, process, transmit, receive, retrieve, originate, switch, store, display, manifest, detect, record, reproduce, handle, and/or utilize any form of data (e.g., information, intelligence, etc.) for business, management, entertainment, or other purposes. For example, an IHS (e.g., 120A, 120B, etc.) may be a personal computer (e.g., a desktop computer, a laptop computer, a mobile computer, a note-book computer, etc.), a personal digital assistant (PDA), a smart phone, a tablet device (or any other a consumer electronic device), a network storage device, a network server, a switch, a router (or any other network communication device), or any other suitable device, and may vary in size, shape, performance, functionality, and price.

In one or more embodiments, as being a physical computing device or a logical computing device, an IHS (e.g., 120A, 120B, etc.) may be configured for, e.g.: (i) hosting and maintaining various workloads, (ii) providing a computing environment (e.g., computing power and storage) whereon workloads may be implemented, (iii) providing computer-implemented services (e.g., receiving a request, sending a response to the request, database services, electronic communication services, data protection services, etc.) to one or more entities (e.g., users, components of the system (100), etc.), (iv) exchanging data with other components registered in/to the network (130) in order to, for example, participate in a collaborative workload placement, and (v) operating as a standalone device. In one or more embodiments, in order to read, write, or store data, an IHS (e.g., 120A, 120B, etc.) may communicate with, for example, a storage array (not shown).

Further, while a single IHS is considered above, the term "system" includes any collection of systems or sub-systems that individually or jointly execute a set, or multiple sets, of instructions to provide one or more computer-implemented services. For example, a single IHS may provide a computer-implemented service on its own (i.e., independently) while multiple other IHSs may provide a second computer-implemented service cooperatively (e.g., each of the multiple other information handling systems may provide similar and or different services that form the cooperatively provided service).

In one or more embodiments, the instructions may embody one or more of the methods or logic in FIGS. 3.1-3.3. In a particular embodiment, the instructions may reside completely, or at least partially, within the storage/memory resource (e.g., 204, FIG. 2.1) or another memory included in the corresponding IHS (e.g., 120A, 120B, etc.), and/or within the processor (e.g., 208, FIG. 2.1) during execution by the IHS (e.g., 120A, 120B, etc.).

To provide any quantity and any type of computer-implemented services, an IHS (e.g., 120A, 120B, etc.) may utilize computing resources provided by various hardware components and/or logical components (e.g., virtualization resources). In one or more embodiments, a computing resource (e.g., a measurable quantity of a compute-relevant resource type that may be requested, allocated, and/or consumed) may be (or may include), for example (but not limited to): a CPU, a graphics processing unit (GPU), a data processing unit (DPU), memory, a network resource, storage space (e.g., to store any type and quantity of information), storage I/O, a hardware resource set, a compute resource set (e.g., one or more processors, processor dedicated memory, etc.), a control resource set, etc. In one or more embodiments, computing resources of an IHS (e.g., 120A, 120B, etc.) may be divided into three logical resource sets: a compute resource set, a control resource set, and a hardware resource set. Different resource sets, or portions thereof, from the same or different IHSs may be aggregated (e.g., caused to operate as a computing device) to instantiate an LCS and/or a composed IHS having at least one resource set from each set of the three resource set model.

In one or more embodiments, a CPU may refer to an electronic circuitry that may execute operations and/or instructions (i.e., computer-readable program code and/or machine byte-code) specified by an application. More specifically, a CPU may perform an operation in three steps: (i) fetching instructions related to the operation from memory, (ii) analyzing the fetched instructions, and (iii) performing the operation based on the analysis. In one or more embodiments, the operation may be, for example (but not limited to): a basic arithmetic calculation, comparing numbers, performing a function, displaying a video, etc.

In one or more embodiments, a CPU may include, for example (but not limited to): 10-core (e.g., an individual processor within a CPU with 3.7 gigahertz (GHz) clock speed, two channels double data rate 4 (DDR4) DRAM support, etc. In one or more embodiments, clock speed may refer to the number of instructions that a CPU is able to handle per second.

In one or more embodiments, as a central processing virtualization platform, a virtual CPU (vCPU) implementation may be provided to one or more LCSs (e.g., 260, FIG. 2.1), in which the vCPU implementation may enable the LCSs to have direct access to a single physical CPU. More specifically, the vCPU implementation may provide computing capabilities by sharing a single physical CPU among LCSs.

In one or more embodiments, a GPU may refer to an electronic circuitry that may provide parallel data processing capabilities to generate enhanced, real-time graphics and to perform accelerated computing tasks (which is particularly useful for machine learning (ML) related operations). In one or more embodiments, a GPU may include, for example (but not limited to): a graphics memory controller, a video processing engine (that is configured to or capable of rendering frames at a particular frame rate (and in some cases, configured to or capable of encoding frames at a particular frame rate)), a graphics and computation engine, etc.

In one or more embodiments, as a graphics virtualization platform, a virtual GPU (vGPU) implementation may be provided to one or more LCSs (e.g., 260, FIG. 2.1), in which the vGPU implementation may enable the LCSs to have direct access to a single physical GPU. More specifically, the vGPU implementation may provide parallel data processing and accelerated computing capabilities by sharing a single physical GPU among LCSs.

In one or more embodiments, breadth-first and depth-first GPU allocation policies may be utilized for vGPU-enabled LCSs. In one or more embodiments, each hypervisor may use a breadth-first or a depth-first GPU allocation policy by default. Each of these GPU allocation policies is described below.

In one or more embodiments, a breadth-first GPU allocation policy may reduce the number of vGPUs executing on one or more physical GPUs. For example, newly generated vGPUs may be placed on a physical GPU that has the fewest vGPUs already resident on it. In one or more embodiments, the breadth-first GPU allocation policy may provide higher performance because this policy reduces sharing of the physical GPUs.

In one or more embodiments, a depth-first GPU allocation policy may increase the number of vGPUs executing on one or more physical GPUs. For example, newly generated vGPUs may be placed on a physical GPU that has the most vGPUs already resident on it. In one or more embodiments, the depth-first GPU allocation policy may provide higher density of vGPUs, particularly when different types of vGPUs are being executed. However, the depth-first GPU allocation policy may also provide lower performance because this policy may maximize sharing of the physical GPUs.

In one or more embodiments, a DPU may refer to an electronic circuitry that may perform accelerated data processing and optimized data movement within a data center. In one or more embodiments, a DPU may include, for example (but not limited to): a high-speed networking interface (e.g., 200 gigabits per second (200 Gb/s)), DRAM, multi-core (e.g., 8-core) CPU, programmable acceleration engines (particularly for ML, security, and telecommunications purposes), etc.

In one or more embodiments, as a data processing virtualization platform, a virtual DPU (vDPU) implementation may be provided to one or more LCSs (e.g., 260, FIG. 2.1), in which the vDPU implementation may enable the LCSs (e.g., 260, FIG. 2.1) to have direct access to a single physical DPU. More specifically, the vDPU implementation may provide full data center-on-chip programmability, and high-performance networking and computing capabilities by sharing a single physical DPU among LCSs (e.g., 260, FIG. 2.1).

Figure 4:
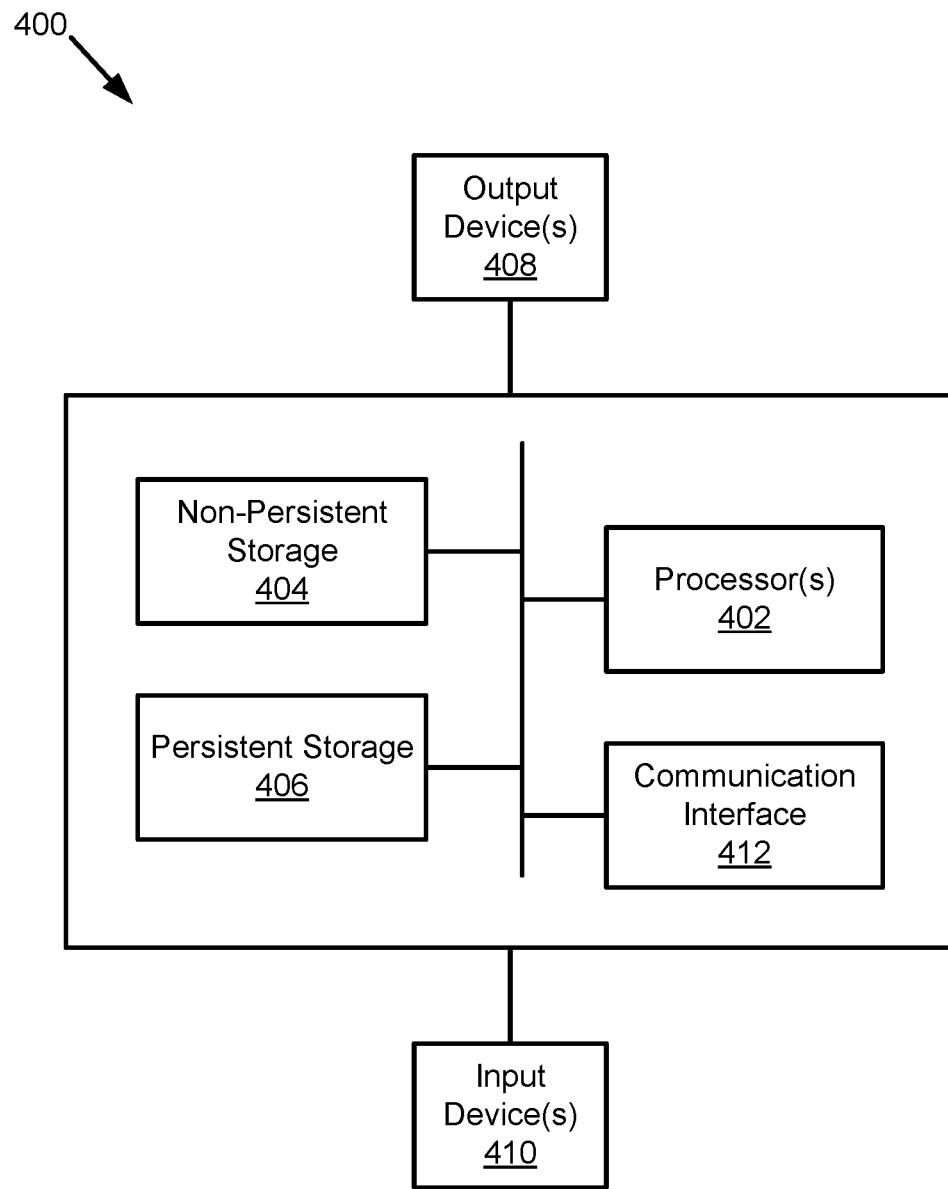
FIG. 4 shows a diagram of a computing device in accordance with one or more embodiments of the invention.

In one or more embodiments, memory may be any hardware component that is used to store data in a computing device (e.g., 400, FIG. 4). The data stored in memory may be accessed almost instantly (e.g., in milliseconds (ms)) regardless of where the data is stored in the memory. In most cases, memory may provide the aforementioned instant data access because memory may be directly connected to a CPU on a wide and fast bus connection (e.g., a high-speed internal connection that transfers data between the hardware components of a computing device (e.g., 400, FIG. 4)).

In one or more embodiments, memory may be (or may include), for example (but not limited to): DRAM (e.g., DDR4 DRAM, error correcting code (ECC) DRAM, etc.), PMEM (e.g., (i) physical computer memory, for data storage, that includes both storage and memory attributes; (ii) byte-addressable like memory that is capable of providing byte-level access of data to applications and/or other logical components; etc.), Flash memory, etc. In one or more embodiments, DRAM may be volatile, which may mean DRAM only stores data as long as it is being supplied with power. Additionally, PMEM and Flash memory may be non-volatile, in which they may store data even after a power supply is removed.

In one or more embodiments, a network resource (or simply "network") may refer to (i) a computer network including two or more computers that are connected any combination of wired and/or wireless connections and/or (ii) for example, a network interface card (NIC) and a network adapter, which may be may be specified in base units of bits per second (bps). The computer network may be generated using hardware components (e.g., routers, access points, cables, switches, etc.) and software components (e.g., OSs, business applications, etc.). In one or more embodiments, geographic location may define a computer network. For example, a local area network (LAN) may connect computing devices in a defined physical space (e.g., in an office building), whereas a wide area network (WAN) (e.g., Internet) may connect computing devices across continents. In one or more embodiments, the computer network may be defined based on network protocols (e.g., TCP, UDP, IPv4, etc.).

In one or more embodiments, the quality of communication over a computer network may be determined by measuring the computer network's QoS. In one or more embodiments, a QoS may include one or more hardware and/or software components to guarantee the computer network's ability to run high-priority applications under limited network capacity. The hardware and/or software components operating on the computer network may accomplish this by providing differentiated handling (e.g., a networking architecture to classify and manage QoS on computer networks) and capacity allocation. In one or more embodiments, parameters that may be used to measure a QoS may include, for example (but not limited to): network BW, delay, jitter, error rate, network throughput, etc.

In one or more embodiments, storage space (or simply "storage") may refer to a hardware component that is used to store data in a computing device (e.g., 400, FIG. 4). In one or more embodiments, storage may be a physical computer-readable medium. For example, storage may be (or may include) HDDs, Flash-based storage devices (e.g., solid-state drives (SSDs)), tape drives, FC based storage devices, and/or other physical/logical storage media ((i) logical storage (e.g., virtual disk) may be implemented using one or more physical storage devices whose storage resources (all, or a portion) are allocated for use using a software layer, and (ii) logical storage may include both physical storage devices and an entity executing on a processor (or other hardware device) that allocates the storage resources of the physical storage devices). Storage may be other types of storage not listed above without departing from the scope of the invention.

In one or more embodiments, storage may be configured as a storage array (e.g., a NAS), in which the storage array may refer to a collection of one or more physical storage devices that may consolidate various forms of data. Each physical storage device may include non-transitory computer readable storage media, in which data may be stored in whole or in part, and temporarily or permanently.

In one or more embodiments, a hardware resource set (e.g., of an IHS, of an external resource, etc.) may include (or specify), for example (but not limited to): a configurable CPU option (e.g., a valid/legitimate vCPU count per-LCS option), a minimum user count per-LCS, a maximum user count per-LCS, a configurable network resource option (e.g., enabling/disabling single-root input/output virtualization (SR-IOV) for specific LCSs), a configurable memory option (e.g., maximum and minimum memory per-LCS), a configurable GPU option (e.g., allowable scheduling policy and/or vGPU count combinations per-LCS), a configurable DPU option (e.g., legitimacy of disabling inter-integrated circuit (I2C) for various LCSs), a configurable storage space option (e.g., a list of disk cloning technologies across all LCSs), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency QoS template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a vCPU count per-LCS (e.g., 2, 4, 8, 16, etc.), a speed select technology configuration (e.g., enabled, disabled, etc.), an LCS hardware virtualization configuration (e.g., enabled, disabled, etc.), an LCS input/output memory management unit (IOMMU) configuration (e.g., enabled, disabled, etc.), a virtual NIC (vNIC) count per-LCS (e.g., 1, 2, etc.), a wake on LAN support configuration (e.g., supported/enabled, not supported/disabled, etc.), an LCS host SR-IOV status configuration (e.g., enabled, disabled, etc.), a swap space configuration per-LCS, a reserved memory configuration (e.g., as a percentage of configured memory such as 0-100%), a memory ballooning configuration (e.g., enabled, disabled, etc.), a vGPU count per-LCS (e.g., 1, 2, 4, 8, etc.), a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU), a storage mode configuration (e.g., an enabled high-performance storage array mode, a disabled high-performance storage array mode, an enabled general storage (i.e., co-processor) mode, a disabled general storage mode, etc.), an I2C interface configuration (e.g., an enabled I2C interface, a disabled I2C interface, etc.), a user profile folder redirection configuration (e.g., a local user profile, a profile redirection, etc.), a file system block size (e.g., 2 megabytes (MB) block size, 8 MB block size, etc.), a backup frequency (e.g., hourly, daily, monthly, etc.), a number of LCSs available for logon (e.g., 0, 10, 20, etc.), different work start time configurations with respect to a number of LCSs to be powered on and available, a virtualization-relevant resource parameter (e.g., an LCS disk I/O latency, an LCS I/O operation per second, etc.), etc.

In one or more embodiments, a control resource set (e.g., of an IHS, of an external resource, etc.) may facilitate formation of LCSs and/or composed IHSs. To do so, a control resource set may prepare (in conjunction with the orchestrator (140)) any quantity of computing resources from any number of hardware resource sets (e.g., of the corresponding IHS and/or other IHSs) for presentation. Once prepared, the control resource set may present the prepared computing resources as bare metal resources to the orchestrator (140). By doing so, an LCS and/or a composed IHS may be instantiated.

To prepare the computing resources of the hardware resource sets for presentation, the control resource set may employ, for example, virtualization, indirection, abstraction, and/or emulation. These management functionalities may be transparent to applications (e.g., 266A, FIG. 2.2) hosted by the resulting instantiated LCSs and/or composed IHSs (e.g., thereby relieving those applications from workload overhead). Consequently, while unknown to components of an LCS and/or a composed IHS, the LCS and/or the composed IHS may operate in accordance with any number of management models thereby providing for unified control and management of the LCSs and/or the composed IHSs.

In one or more embodiments, the orchestrator (140) may implement a management model to manage computing resources (e.g., computing resources provided by one or more hardware devices of IHSs) in a particular manner. The management model may give rise to additional functionalities for the computing resources. For example, the management model may be automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the scope of the invention.

In one or more embodiments, in conjunction with the orchestrator (140), a system control processor (e.g., 208, FIG. 2.1) of an IHS may cooperatively enable hardware resource sets of other IHSs to be prepared and presented as bare metal resources to LCSs and/or composed IHSs. The system control processor may be operably connected to external resources (not shown) via a network interface (e.g., 212, FIG. 2.1) and the network (130) so that the system control processor may prepare and present the external resources as bare metal resources as well.

In one or more embodiments, a compute resource set, a control resource set, and/or a hardware resource set may be implemented as separate physical devices. In such a scenario, any of these resource sets may include NICs or other devices to enable the hardware devices of the respective resource sets to communicate with each other.

An IHS (e.g., 120A, 120B, etc.) may split up a request with another component of the system (100), coordinating its efforts to complete the request (e.g., to generate a response) more efficiently than if the IHS (e.g., 120A, 120B, etc.) had been responsible for completing the request. In one or more embodiments, a request may be, for example (but not limited to): a web browser search request, a representational state transfer (REST) request, a computing request, a database management request, a registration request, a file upload/download request, etc. To provide computer-implemented services to one or more entities, the IHS (e.g., 120A, 120B, etc.) may perform computations locally and/or remotely. By doing so, the IHS (e.g., 120A, 120B, etc.) may utilize different computing devices (e.g., 400, FIG. 4) that have different quantities of computing resources to provide a consistent experience to the entities. In one or more embodiments, the IHS (e.g., 120A, 120B, etc.) may be a heterogeneous set, including different types of hardware components and/or different types of OSs.

In one or more embodiments, an IHS (e.g., 120A, 120B, etc.) may host any number of applications (and/or content accessible through the applications) that provide application services to the clients (110). Application services may include, for example (but not limited to): instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in the IHS (e.g., 120A, 120B, etc.). In one or more embodiments, applications may be logical entities executed using computing resources of the IHS (e.g., 120A, 120B, etc.). For example, applications may be implemented as computer instructions, e.g., computer code, stored on persistent storage of the IHS (e.g., 120A, 120B, etc.) that when executed by the processor(s) of the IHS cause the IHS to provide the functionality of the applications described throughout the application.

In one or more embodiments, while performing, for example, one or more operations requested by a user of a client of the clients (110), applications installed on the IHS (e.g., 120A, 120B, etc.) may include functionality to request and use resources (e.g., data, computing resources, etc.) of the IHS (e.g., 120A, 120B, etc.). Applications may also perform other types of functionalities not listed above without departing from the scope of the invention. In one or more embodiments, while providing application services to a user, applications may store (temporarily or permanently) data that may be relevant to the user in persistent storage of the IHS (e.g., 120A, 120B, etc.).

In one or more embodiments, an IHS (e.g., 120A, 120B, etc.) may include any number of LCSs (e.g., 260, FIG. 2.1) that host the above-discussed applications (e.g., 266A, FIG. 2.2). The LCSs may be logical entities executed using the physical and logical components of the IHS (e.g., 120A, 120B, etc.), or using computing resources of other computing devices connected to the IHS (e.g., 120A, 120B, etc.). Each of the LCSs may perform similar or different processes. In one or more embodiments, the LCSs (and applications hosted by the LCSs) may generate data (e.g., LCS data) that may reflect a state of an LCS.

In one or more embodiments, an IHS (e.g., 120A, 120B, etc.) may also include a production agent, which is configured to locally orchestrate the performance of data protection operations. For example, the production agent may perform a data protection operation under the direction of a client, in which the client sends instructions to the production agent regarding: (i) when one or more operations should be performed, (ii) where the resulting data backup(s) should be stored (temporarily or permanently), and (iii) when a VM should be restored to a previous state. Other instructions not listed above may also be sent without departing from the scope of the invention. In one or more embodiments, the production agent may be implemented using hardware, software, or any combination thereof.

In one or more embodiments, an IHS (e.g., 120A, 120B, etc.) may include functionality to: (i) consolidate multiple data process or protection requests (received from, for example, the clients (110)) so that duplicative operations (which may not be useful for restoration purposes) are not generated, and (ii) initiate multiple data process or protection operations in parallel. For example, the production agent may host multiple operations. Each of the multiple operations may (a) manage the initiation of a respective operation and (b) operate concurrently to initiate multiple operations.

In one or more embodiments, in order to provide the above-mentioned functionalities, an IHS (e.g., 120A, 120B, etc.) may need to communicate with other components of the system (100) with minimum amount of latency (e.g., with high-throughput (e.g., a high data transfer rate) and sub-ms latency). For this reason, REST application programming interfaces (REST APIs) may be used to enable communication(s) between the IHS (e.g., 120A, 120B, etc.) and the other components.

As discussed above, an IHS (e.g., 120A, 120B, etc.) may provide any quantity and type of computer-implemented services. To provide the computer-implemented services, resources of the IHS (discussed above) may be used to instantiate one or more LCSs (e.g., 260, FIG. 2.1) and/or composed IHSs. The composed IHSs and/or LCSs may provide the computer-implemented services.

While an IHS (e.g., 120A, 120B, etc.) has been illustrated and described as including a limited number of specific components and/or hardware resources, the IHS (e.g., 120A, 120B, etc.) may include additional, fewer, and/or different components without departing from the scope of the invention.

One of ordinary skill will appreciate that an IHS (e.g., 120A, 120B, etc.) may perform other functionalities without departing from the scope of the invention. In one or more embodiments, the IHS (e.g., 120A, 120B, etc.) may be configured to perform all, or a portion, of the functionalities described in FIGS. 3.1-3.3. Additional details of the IHS are described below in reference to FIGS. 2.1 and 2.2.

In one or more embodiments, an IHS (e.g., 120A, 120B, etc.) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, SSDs, etc.). The computing device may include instructions, stored in the persistent storage, that when executed by the processor(s) of the computing device cause the computing device to perform the functionality of the IHS (e.g., 120A, 120B, etc.) described throughout this application.

Alternatively, in one or more embodiments, the IHS (e.g., 120A, 120B, etc.) may be implemented as a logical device. The logical device may utilize the computing resources of any number of computing devices to provide the functionality of the IHS (e.g., 120A, 120B, etc.) described throughout this application.

In one or more embodiments, the clients (110) may be physical or logical computing devices configured for hosting one or more workloads, or for providing a computing environment whereon workloads may be implemented. The clients (110) may correspond to computing devices that one or more users use to interact with one or more components of the system (100).

In one or more embodiments, a client of the clients (110) may include any number of applications (and/or content accessible through the applications) that provide computer-implemented application services to a user. Applications may be designed and configured to perform one or more functions instantiated by a user of the client. Examples of an application may include (but not limited to): a word processor, a media player, a web browser, a file viewer, an image editor, etc.

In order to provide application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client of the clients (110). In one or more embodiments, applications may be logical entities executed using computing resources of a client. For example, applications may be implemented as computer instructions, e.g., computer code, stored on persistent storage of the client that when executed by the processor(s) of the client cause the client to provide the functionality of the applications described throughout the application.

In one or more embodiments, while performing, for example, one or more operations requested by a user, applications installed on a client of the clients (110) may include functionality to request and use physical and logical components of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of the client.

In one or more embodiments, the clients (110) may interact with the IHSs (e.g., 120A, 120B, etc.). For example, the clients (110) may issue requests to the IHSs (e.g., 120A, 120B, etc.) to receive responses and interact with various components of the IHSs (e.g., 120A, 120B, etc.). The clients (110) may also request data from and/or send data to the IHSs (e.g., 120A, 120B, etc.). As yet another example, the clients (110) may utilize application services provided by the IHSs (e.g., 120A, 120B, etc.). When the clients (110) interact with the IHSs (e.g., 120A, 120B, etc.), data that is relevant to the clients (110) may be stored (temporarily or permanently) in the IHSs (e.g., 120A, 120B, etc.).

As yet another example, consider a scenario in which an IHS (e.g., 120A, 120B, etc.) hosts a database utilized by the clients (110). In this scenario, the database may be a client database associated with users of the clients (110). When a new user is identified, the clients (110) may add information of the new user to the client database. By doing so, data that is relevant to the clients (110) may be stored in the IHS (e.g., 120A, 120B, etc.). This may be done because the clients (110) may desire access to the information of the new user at some point-in-time.

As yet another example, a client of the clients (110) may execute an application that interacts with an application database hosted by an IHS (e.g., 120A, 120B, etc.). When an application upgrade is available to fix a critical software issue, the IHS (e.g., 120A, 120B, etc.) may identify the client that requires the application upgrade. The application database may then provide the application upgrade to the client. By doing so, the application executed by the client may be kept up-to-date. As yet another example, the clients (110) may send instructions to the IHSs (e.g., 120A, 120B, etc.) to configure one or more LCSs hosted by the IHSs (e.g., 120A, 120B, etc.). In one or more embodiments, instructions may be, for example (but not limited to): instructions to configure a backup policy, instructions to take a snapshot of LCS data, etc.

As yet another example, a client of the clients (110) may initiate an application to execute on an IHSs (e.g., 120A, 120B, etc.) such that the application may (itself) gather, transmit, and/or otherwise manipulate data located in the IHSs (e.g., 120A, 120B, etc.), remote to the client. In one or more embodiments, the clients (110) may share access to more than one IHS and may similarly share any data located in those IHSs.

In one or more embodiments, the clients (110) may provide computer-implemented services to users (and/or other computing devices such as, for example, other clients or other types of components). The clients (110) may provide any quantity and any type of computer-implemented services (e.g., data storage services, electronic communication services, etc.). To provide computer-implemented services, each client may include a collection of physical components (described below) configured to perform operations of the client and/or otherwise execute a collection of logical components (described below) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a GPU, a DPU, a computation acceleration resource, an application-specific integrated circuit (ASIC), a digital signal processor for facilitating high-speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, a client of the clients (110) may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (110) provide computer-implemented services to users, the clients (110) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (110) may enter into agreements (e.g., SLAs) with providers of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a NIC, a network adapter, a network processor, etc.

In one or more embodiments, a networking resource may provide capabilities to interface a client with external entities (e.g., other clients, the IHSs (e.g., 120A, 120B, etc.), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., TCP, UDP, Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients. For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a vCPU, a virtual storage pool, etc. In one or more embodiments, a virtualization resource may include a hypervisor, in which the hypervisor may be configured to orchestrate an operation of, for example, a VM by allocating computing resources of a client to the VM.

In one or more embodiments, the clients (110) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (110) described throughout the application.

Alternatively, in one or more embodiments, similar to the IHSs (e.g., 120A, 120B, etc. 122), the clients (110) may also be implemented as logical devices.

In one or more embodiments, users (e.g., tenants) may interact with (or operate) the clients (110) in order to perform work-related tasks (e.g., production workloads). In one or more embodiments, the accessibility of users to the clients (110) may depend on a regulation set by an administrator of the clients (110). To this end, each user may have a personalized user account that may, for example, grant access to certain data, applications, and computing resources of the clients (110). This may be realized by implementing the "virtualization" technology (discussed above). In one or more embodiments, an administrator may be a user with permission (e.g., a user that has root-level access) to make changes on the clients (110) that will affect other users of the clients (110).

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a GUI generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 400, FIG. 4) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, the network (130) (or the "network environment") may represent a (decentralized or distributed) computing network and/or fabric configured for computing resource and/or messages exchange among registered computing devices (e.g., the clients (110), the IHSs (e.g., 120A, 120B, etc.), etc.). As discussed above, components of the system (100) may operatively connect to one another through the network (130) (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network (130) may be operably connected to the Internet or other networks. Further, the network (130) may enable interactions between, for example, the clients (110) and the IHSs (e.g., 120A, 120B, etc.) through any number and type of wired and/or wireless network protocols (e.g., TCP, UDP, IPv4, etc.). Further, the network (130) may be configured to perform all, or a portion, of the functionality described in FIGS. 3.1-3.3.

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network (130), and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

In one or more embodiments, the non-real-time network traffic may be low-priority (e.g., non-urgent) network traffic. For this reason, data packets of the non-real-time network traffic may not need to be prioritized in the network (130). The non-real-time network traffic may include data packets related to, for example (but not limited to): File Transfer Protocol (FTP) for web publishing, email applications, etc.

In one or more embodiments, the orchestrator (140) may refer to a system control plane manager (SCPM) (or an external control plane). The orchestrator (140) may include functionality to, e.g.: (i) receive an intention request from a user via a client (e.g., the orchestrator (140) may receive a request to execute a certain application or functionality on a bare metal system or on a "composed" LCS (e.g., 260A, FIG. 2.1)); (ii) analyze (through its intention handler) an intention specified in a request received from a user (discussed below), for example, to compose and to decide where to put one or more LCSs (e.g., 260, FIG. 2.1); (iii) provide a firmware stack (e.g., an integrated Dell remote access controller (iDRAC®) provided by Dell) to an IHS (e.g., 120A, 120B, etc.); (iv) develop and/or deploy standard baseboard management controller (BMC) firmware stacks to a BMC (e.g., 220, FIG. 2.2); (v) sign all of the firmware and/or software (e.g., a user's kernel, a user application, etc.) within an IHS (e.g., 120A, 120B, etc.) so that, for example, a user may ensure that firmware and/or software executing on the IHS are the firmware and/or software that the user intended to load and execute on the IHS; (vi) provide, to a microvisor agent (e.g., 254, FIG. 2.2), a CT that is required to provision an LCS (e.g., 260A, FIG. 2.1) on an IHS (e.g., 200, FIG. 2.1); (vii) manage one or more microvisors (e.g., 240, FIG. 2.1) deployed to one or more IHSs (e.g., 120A, 120B, etc.); (viii) being responsible for the management (e.g., including management of policy actions on an IHS) and placement of workloads on LCSs (e.g., 260, FIG. 2.1); (ix) use/employ a microvisor (e.g., 240, FIG. 2.1) as an LCS deployment/management conduit to deploy/execute/manage one or more LCSs on the corresponding IHS (e.g., 120A, 120B, etc.) based on available computing resources of the IHSs (e.g., 120A, 120B, etc.) in the system (100); (x) manage distribution or allocation of available computing resources (e.g., user subscriptions to available resources) against a particular LCS on an IHS (e.g., 120A, 120B, etc.); (xi) obtain and track (periodically) resource utilization levels (or key performance metrics with respect to, for example, network latency, the number of open ports, OS vulnerability patching, network port open/close integrity, multitenancy related isolation, password policy, system vulnerability, data protection/encryption, data privacy/confidentiality, data integrity, data availability, be able to identify and protect against anticipated and/or non-anticipated security threats/breaches, etc.) of LCSs across all IHSs (by obtaining telemetry data and/or logs) to identify (a) which LCS is a healthy LCS (e.g., an LCS that generates a response to a request) and (b) which LCS is an unhealthy LCS (e.g., an LCS that does not generate a response to a request, an over-provisioned LCS, an LCS that is slowing down in terms of performance, an LCS' resource utilization value is exceeding a predetermined maximum resource utilization value threshold, etc.); (xii) based on (xi), manage health of each LCS by implementing a policy (e.g., to manage an aggregate workload across the LCSs, to manage SLA and QoS compliance (discussed below) as well as load balancing, etc.); (xiii) identify health (e.g., a current status) of each LCS based on average, minimum, and maximum resource utilization values; (xiv) provide identified health of each LCS to other entities (e.g., administrators); (xv) automatically react and generate alerts (e.g., a predictive alert, a proactive alert, a technical alert, etc.) if one of the predetermined maximum resource utilization value thresholds is exceeded; (xvi) communicate with the corresponding microvisor (e.g., 240, FIG. 2.1) over the corresponding network interface (e.g., 232, FIG. 2.1); (xvii) add/remove resources (e.g., processing resources, memory resources, storages resources, etc.) of IHSs (e.g., 120A, 120B, etc.) to one or more LCSs (e.g., 260, FIG. 2.1) so that the LCSs may provide computer-implemented services to the corresponding tenants; (xviii) manage hardware resources of the IHSs (e.g., 120A, 120B, etc.) and/or other resources (e.g., external resources) to provide computer-implemented services (e.g., where the resources of the IHSs may be managed by instantiating one or more LCSs using resources of IHSs, external resources, and/or other types of hardware devices operably connected to the IHSs); (xix) provide LCS and/or composed IHS composition services (described below); and (xx) store (temporarily or permanently) the aforementioned data and/or the output(s) of the above-discussed processes in a database. One of ordinary skill will appreciate that the orchestrator (140) may perform other functionalities without departing from the scope of the invention.

In one or more embodiments, a CT may include (or specify), for example (but not limited to): a first hardware resource set of a first IHS, a second hardware resource set of a second IHS, a third hardware resource set of an external resource, etc. In one or more embodiments, the first hardware resource set may include hardware resources that are distinct from a second hardware resource and/or a third hardware resource set.

As used herein, the term "management controller" may broadly refer to a system that provides management functionality (typically out-of-band management functionality) to one or more IHSs (e.g., e.g., 120A, 120B, etc.). In one or more embodiments, a management controller may be (or may be an integral part of) a service processor, a BMC, a chassis management controller (CMC), or a remote access controller (e.g., a Dell remote access controller (DRAC®) or an iDRAC®).

In one or more embodiments, a BMC firmware stack may provide out-of-band monitoring and management of the hardware components of an IHS (e.g., 120A, 120B, etc.). Examples of monitoring functions that the BMC firmware stack may include, but not limited to, monitoring internal ambient temperatures and/or voltages in an IHS, along with network usage levels, and the like. Examples of management features may include installation of software including the base OS (of an IHS), managing operation of one or more environmental control components in an IHS, turning certain hardware components of an IHS on or off, and the like.

In one or more embodiments, information (e.g., resource utilization levels, logs, SLA and QoS compliance data from each LCS, load balancing between LCSs, key performance metrics related to the LCSs, etc.) may be obtained as they become available or by the orchestrator (140) polling the corresponding LCSs (e.g., 260, FIG. 2.1) (by making an API call to the corresponding microvisor (e.g., 240, FIG. 2.1) that is managing those LCSs) for new information. Based on receiving the API call from the orchestrator (140), the corresponding microvisor (e.g., 240, FIG. 2.1) may allow the orchestrator (140) to obtain the information.

In one or more embodiments, the aforementioned information may be obtained (or streamed) continuously (without affecting production workloads of the corresponding microvisor (e.g., 240, FIG. 2.1)), as they generated, or they may be obtained in batches, for example, in scenarios where (i) the orchestrator (140) receives a failure score calculation request (e.g., a health check request), (ii) the corresponding microvisor accumulates the information and provides them to the orchestrator (140) at fixed time intervals, or (iii) the corresponding microvisor stores the information in its storage (or in an external entity) and notifies the orchestrator (140) to access the information from its storage or from the external entity. In one or more embodiments, the information may be access-protected for the transmission from the corresponding microvisor to the orchestrator (140), e.g., using encryption.

In one or more embodiments, the orchestrator (140) may monitor service performance and resource utilization of each LCS (for, for example, troubleshooting and optimization) by obtaining telemetry data about each LCS' technology stack (e.g., telemetry data about computing resources of each LCS, composed system data, etc.) from the corresponding microvisor (e.g., 240, FIG. 2.1). In one example, the orchestrator (140) may: (i) monitor actions being performed, computation power being consumed, communications being sent or received, etc. by each LCS, (ii) monitor communications being sent or received by each LCS by intercepting them, (iii) based on the intercepted communications, determine utilization rates of one or more resources by an LCS, and (iv) store (temporarily or permanently) the resource utilization rates (e.g., including estimates, measurements, etc.) in the database.

In one or more embodiments, while monitoring via the corresponding microvisor, the orchestrator (140) may need to, for example (but not limited to): inventory one or more components of each LCS, obtain a type and a model of a component of an LCS, obtain a version of firmware or other code executing on an LCS, obtain information regarding a hardware component or a software component of an IHS (e.g., 120A, 120B, etc.) that may be allocated to an LCS, obtain information specifying each LCS' interaction with one another and/or with another component of the corresponding microvisor, etc.

In one or more embodiments, in order to manage the health of LCSs (in particular, the health of unhealthy LCSs) and resolve bottlenecks without affecting the operation of the entire distributed computing architecture, the orchestrator (140) may take one or more preventive (and proactive) actions. In one or more embodiments, a preventive action may be, for example (but not limited to): performing workload redistribution among LCSs (e.g., high-performance load balancing) (for example, to prevent workload mismatch between LCSs and to manage the overall operation of the architecture), reducing the quantity of unnecessary REST API calls (for example, to prevent unnecessary memory utilization and to improve the likelihood that the unhealthy LCSs are healthy again), modifying (e.g., adding, removing, etc.) resources allocated to an LCS (for example, to ensure highly available LCSs), modifying a predetermined maximum resource utilization value threshold (e.g., increasing a predetermined maximum CPU utilization value threshold from 70% to 88% so that LCS X may take more workloads), testing (in terms of resource utilization and workload assignment) a new LCS that will be added into the an IHS before causing an impact on the IHS, etc.

Further, in one or more embodiments, the orchestrator (140) may receive one or more composition requests (e.g., an LCS composition request) from one or more users. A composition request may indicate a desired outcome such as, for example, execution of one or more application on an LCS, providing of one or more services (e.g., by an LCS), etc. The orchestrator (140) may translate the composition request into corresponding quantities of computing resources necessary to be allocated (e.g., to the LCS) to satisfy the intent of the composition request.

Once the quantities of computing resources are obtained, the orchestrator (140) may allocate resources of the IHSs (e.g., 120A, 120B, etc.) to meet the identified quantities of computing resources by instructing processors (e.g., 208, FIG. 2.1) of the IHSs to prepare and present resources (e.g., hardware resource sets) of the IHSs to compute resource sets of the IHSs.

Additionally, the orchestrator (140) may instruct the processors to manage the hardware resources of the hardware resource sets in accordance with one or more models (e.g., data integrity, security, etc.). However, when the processors present these resources to the compute resource sets, the processors may present the resources as bare metal resources while managing them in more complex manners. By doing so, embodiments of the invention may provide a framework for unified security, manageability, resource management/composability, workload management, and distributed system management by use of processors of IHSs.

Managing computing resources of IHSs in this manner may enable the computing resources to be differentiated to provide different functionalities including, for example, server, storage, networking, data protection, mass storage, etc. Consequently, (i) "composed" LCSs (e.g., 260, FIG. 2.1) having these desired functionalities may be efficiently instantiated and (ii) resources allocated to an LCS may be tailored to the specific needs of the services that will be provided by the LCS.

In one or more embodiments, LCS and/or composed IHS composition services may include, at least, (i) obtaining composition requests for LCSs and/or composed IHSs and (ii) aggregating computing resources from IHSs (e.g., 120A, 120B, etc.) and/or external resources using the corresponding processors to service the composition requests by instantiating LCSs and/or composed IHSs in accordance with the requests. By doing so, instantiated LCSs and/or composed IHSs may provide computer-implemented services in accordance with the composition requests.

As discussed above, computing resources of an IHS (e.g., 120A, 120B, etc.) may be divided into three logical resource sets (e.g., a compute resource set, a control resource set, and a hardware resource set). By logically dividing the computing resources of an IHS into these resource sets, different quantities and types of computing resources may be allocated to each LCS and/or composed IHS thereby enabling the resources allocated to the respective LCS and/or IHS to match performed workloads. Further, dividing the computing resources in accordance with the three set model may enable different resource sets to be differentiated (e.g., given different personalities) to provide different functionalities. Consequently, LCSs and/or IHSs may be composed on the basis of desired functionalities rather than just on the basis of aggregate resources to be included in the LCSs and/or composed IHSs.

Additionally, by composing LCSs and/or IHSs in this manner, the control resource set of each IHS may be used to consistently deploy management services across any number of LCSs and/or composed IHSs. Consequently, embodiments of the invention may provide a framework for unified security, manageability, resource management/composability, workload management, and distributed system management by use of this three resource set model.

As discussed above, to instantiate LCSs and/or composed IHSs, the IHSs (e.g., 120A, 120B, etc.) may include at least three resource sets including a control resource set. The control resource set may include a processor (e.g., 208, FIG. 2.1). The corresponding processor of each IHS may coordinate with the orchestrator (140) to enable LCSs and/or composed IHSs to be instantiated. For example, the corresponding processor of an IHS may provide telemetry data regarding the computing resources of an IHS, may perform actions on behalf of the orchestrator (140) to aggregate computing resources together, may organize the performance of duplicative workloads to improve the likelihood that workloads are completed, and/or may provide services that unify the operation of LCSs and/or composed IHSs.

In one or more embodiments, the corresponding processor of an IHS (e.g., 120A, 120B, etc.) may mediate presentation of the computing resources provided by the hardware resources (of the IHS) to a computing resource set (e.g., as bare metal resources). When doing so, the corresponding processor may provide a layer of abstraction that enables the hardware resources to be, for example, virtualized, emulated as being compatible with other systems, and/or directly connected to the compute resource set (e.g., pass through). Consequently, the computing resources of the hardware resources may be finely, or at a macro level, allocated to different LCSs and/or composed IHSs.

In one or more embodiments, composition requests may specify computing resource allocations using an intent based model (e.g., intent based requests). For example, rather than specifying specific hardware resources/devices (or portions thereof) to be allocated to a particular compute resource set to obtain an LCS and/or a composed IHS, composition requests may only specify that an LCS and/or a composed IHS is to be instantiated having predetermined characteristics, that an LCS and/or a composed IHS will perform certain workloads or execute certain applications, and/or that the LCS and/or composed IHS be able to perform one or more predetermined functionalities. In such a scenario, a composition manager of the corresponding processor may decide how to instantiate the LCS and/or composed IHS (e.g., which resources to allocate, how to allocate the resources (e.g., virtualization, emulation, redundant workload performance, data integrity models to employ, etc.), etc.).

In one or more embodiments, composition requests may specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the LCSs and/or composed IHSs, security models to be employed by the LCSs and/or composed IHSs, communication models to be employed by the LCSs and/or composed IHSs, services to be provided to the LCSs and/or composed IHSs, user/entity access credentials for use of the LCSs and/or composed IHSs, and/or other information usable to place the LCSs and/or composed IHSs into states in which the LCSs and/or composed IHSs provide desired computer-implemented services.

In one or more embodiments, to provide composition services, the orchestrator (140) may include an infrastructure manager (not shown). Composition services may include, for example (but not limited to): obtaining composition requests for LCSs and/or composed IHSs, determining the resources to allocate to instantiate LCSs and/or IHSs, cooperating with the corresponding processors of IHSs (e.g., 120A, 120B, etc.) to allocate identified resources, etc. By doing so, the infrastructure manager may cause any number of computer-implemented services to be provided using the LCSs and/or IHSs.

To determine the resources to allocate to LCSs and/or IHSs, the infrastructure manager may employ an intent based model that translates an intent expressed in a composition request to one or more allocations of computing resources. For example, the infrastructure manager may utilize an outcome based computing resource requirements lookup table to match an expressed intent to resources to be allocated to satisfy that intent. The outcome based computing resource requirements lookup table may specify the type, make, quantity, method of management, and/or other information regarding any number of computing resources that when aggregated will be able to satisfy a corresponding intent. The infrastructure manager may identify resources for allocation to satisfy composition requests via other methods without departing from the scope of the invention.

To cooperate with the corresponding processors, the infrastructure manager may obtain telemetry data regarding the computing resources of any number of IHSs and/or external resources that are available for allocation. The infrastructure manager may aggregate this data in a telemetry data map that may be subsequently used to identify resources of any number of IHSs and/or external resources to satisfy composition requests (e.g., instantiate one or more LCSs and/or IHSs to meet the requirements of the composition requests).

When the infrastructure manager identifies the computing resources to be allocated, the infrastructure manager may communicate with the corresponding processors (of the IHSs) to implement the identified allocations. For example, the infrastructure manager may notify a processor of a control resource set that portions of a hardware resource set are to be allocated to a compute resource set to instantiate an LCS and/or a composed IHS. The processor may then take action (e.g., prepare the portion of the hardware resource set for presentation to the compute resource set) in response to the notification.

As LCSs and/or composed IHSs are instantiated, the infrastructure manager may add information reflecting the resources allocated to LCSs and/or composed IHSs, the workloads being performed by the LCSs and/or composed IHSs, and/or other types of information to a composed infrastructure map. The infrastructure manager may utilize this information to, for example, decide whether computing resources should be added to or removed from LCSs and/or IHSs. Consequently, computing resources may be dynamically re-provisioned over to meet changing workloads imposed on LCSs and/or IHSs.

In one or more embodiments, the orchestrator (140) may include a deployment manager (not shown), in which the deployment manager may provide recomposition services. Recomposition services may include (i) monitoring the health of computing resources of LCSs and/or composed IHSs, (ii) determining, based on the health of the computing resources, whether the computing resources are compromised, and/or (iii) initiating recomposition of computing resources that are compromised. By doing so, the deployment manager may improve the likelihood that computer-implemented services provided by LCSs and/or composed IHSs meet user/tenant expectations. When providing the recomposition services, the deployment manager may maintain a health status repository that includes information reflecting the health of both allocated and unallocated computing resources. For example, the deployment manager may update the health status repository when it receives information regarding the health of various computing resources.

When providing recomposition services, the deployment manager may receive recomposition requests from the corresponding processors that have determined that at least some of the computing resources of an LCS and/or a composed IHS have been compromised. In such a scenario, the deployment manager may elect to recompose the computing resources in response to the request or may delay recomposition to a later period of time. The deployment manager may make the aforementioned determination based on whether the compromised computing resources are likely to prevent the LCS and/or composed IHS from providing desired computer-implemented services. If the compromised computing resources are unlikely to negatively impact the provided services, then the deployment manager may delay initiating recomposition of the computing resources (e.g., by generating and sending an appropriate request to the infrastructure manager).

One of ordinary skill will appreciate that the infrastructure manager and deployment manager may perform other functionalities without departing from the scope of the invention. The infrastructure manager and deployment manager may be implemented using hardware, software, or any combination thereof.

In one or more embodiments, the orchestrator (140) may include a database (not shown) to store unstructured and/or structured data structures such as, for example, a telemetry data map, a composed infrastructure map, an infrastructure utilization map, a health status repository, and a composable asset map. These data structures may be maintained by, for example, the infrastructure manager and/or the deployment manager. For example, the infrastructure manager and/or deployment manager may add, remove, and/or modify information included in these data structures to cause the information included in these data structures to reflect the state of any number of IHSs, external resources, and/or LCSs and/or composed IHSs.

Any of these data structures may be implemented using any combination and quantity of, for example, lists, tables, unstructured data, databases, etc. While illustrated as being stored locally, any of these data structures may be stored remotely and may be distributed across any number of devices without departing from the invention. Further, while the database has been illustrated and described as including a limited number and type of data, the database may store additional, less, and/or different data without departing from the scope of the invention.

In one or more embodiments, SLA and QoS parameters (e.g., SLA and QoS constraints, SLA and QoS compliance parameters, etc.) may include (or specify), for example (but not limited to): network latency, logon time, frame rate, a number of dropped packets, storage I/O latency, end-to-end user latency, a minimum user count (e.g., each LCS should support minimum 50 users), a maximum user count (e.g., each LCS should support maximum 350 users), a maximum network latency threshold that needs to be met by an LCS (e.g., network latency should be less than 5 ms), a maximum dropped packets threshold that needs to be met by an LCS (e.g., less than 1.5% dropped packets is acceptable), a maximum storage I/O latency threshold that needs to be met by an LCS (e.g., storage I/O latency should be less than 10 ms), a maximum end-to-end I/O user latency threshold that needs to be met by an LCS (e.g., end-to-end I/O user latency should be less than 15 ms), manage a set of tenants accordingly during a peak load event (e.g., during a peak load event, Tenant X get a priority and a preference to the resources over Tenant Y because Tenant X has the priority specified in the SLA and QoS constraints), provide an always-access guarantee to computing resources (e.g., especially to certain resources when contention over subscription occurs) for a user/tenant with a user access level/tier of 9/10, etc.

While the orchestrator (140) has been illustrated and described as including a limited number of specific components, the orchestrator (140) may include additional, fewer, and/or different components than those mentioned above without departing from the scope of the invention.

In one or more embodiments, the orchestrator (140) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the orchestrator (140) described throughout the application.

Alternatively, in one or more embodiments, similar to the IHSs (e.g., 120A, 120B, etc. 122), the orchestrator (140) may also be implemented as a logical device.

Turning now to FIG. 2.1. FIG. 2.1 shows a diagram of an IHS (200) in accordance with one or more embodiments of the invention. The IHS (200) may be an example of an IHS discussed above in reference to FIG. 1. The IHS (200) may include (i) a host system (202) that hosts a storage/memory resource (204), a processor (208), a BIOS (210) (e.g., a UEFI BIOS), a BIOS microvisor loader (215), a microvisor (240), a microvisor user space (250), and a network interface (212); (ii) a BMC (220) that hosts a processor (not shown) and a network interface (224); and (iii) one or more LCSs (260). The IHS (200) may include additional, fewer, and/or different components without departing from the scope of the invention. Each component may be operably connected to any of the other component via any combination of wired and/or wireless connections. Each component illustrated in FIG. 2.1 is discussed below.

In one or more embodiments, the processor (208) (e.g., a node processor, one or more processor cores, one or more processor micro-cores, etc.) may be communicatively coupled to the storage/memory resource (204), the BIOS (210), and the network interface (212) via any suitable interface, for example, a system interconnect including one or more system buses (operable to transmit communication between various hardware components) and/or peripheral component interconnect express (PCIe) bus/interface. In one or more embodiments, the processor (208) may be configured for executing machine-executable code like a CPU, a programmable logic array (PLA), an embedded device such as a System-on-a-Chip (SoC), or hardware/software control logic.

More specifically, the processor (208) may include any system, device, or apparatus configured to interpret and/or execute program instructions and/or process data, and may include, without limitation, a microprocessor, a microcontroller, a digital signal processor (DSP), an ASIC, or any other digital or analog circuitry configured to interpret and/or execute program instructions and/or process data. In one or more embodiments, the processor (208) may interpret and/or execute program instructions and/or process data stored in the storage/memory resource (204) and/or another component of IHS (200).

In one or more embodiments, the processor (208) may utilize the network interface (212) to communicate with other devices to manage (e.g., instantiate, monitor, modify, etc.) LCSs (e.g., 260) and/or composed IHSs (in conjunction with the orchestrator (e.g., 140, FIG. 1)). Additionally, the processor (208) may manage operation of hardware devices of the IHS (200) in accordance with one or more models including, for example, data protection models, security models such as encrypting stored data, workload performance availability models such as implementing statistic characterization of workload performance, reporting models, etc. For example, the processor (208) may instantiate redundant performance of workloads for high-availability services.

In one or more embodiments, the processor (208) may facilitate instantiation (in conjunction with the orchestrator (e.g., 140, FIG. 1)) of LCSs and/or composed IHSs. By doing so, a system that includes IHSs may dynamically instantiate LCSs and/or composed IHSs to provide computer-implemented services. To instantiate LCSs and/or composed IHSs, the processor (208) may include a composition manager, a physical resources manager, an emulated resources manager, a virtual resources manager, an operation manager, and hardware resource services. Each of these components of the processor (208) is discussed below.

The composition manager may manage/help the process of instantiating LCSs and/or composed IHSs. To provide these management services, the composition manager may include functionality to, e.g.: (i) obtain information regarding the hardware components of the corresponding IHS (e.g., obtain telemetry data regarding the IHS), (ii) provide the obtained information to other entities (e.g., management entities such as the orchestrator (e.g., 140, FIG. 1), (iii) obtain composition requests for LCSs and/or composed IHSs, (iv) based on the composition requests, prepare and present resources as bare metal resources to compute resource sets, (v) instantiate applications in composed IHSs to cause the composed IHSs to provide computer-implemented services, conform their operation to security models, etc., (vi) manage the operation of the composed IHSs by, for example, duplicating performance of workloads to improve the likelihood that the output of workloads are available, (vii) add/remove/modify resources presented to the compute resource sets of composed IHSs dynamically in accordance with workloads being performed by the composed IHSs, and (viii) coordinate with other processors to provide distributed system functionalities. By providing the above functionalities, the processor (208) may enable distributed resources from any number of IHSs to be aggregated into an LCS and/or a composed IHS to provide computer-implemented services.

To obtain information regarding the hardware components of the corresponding IHS, the composition manager may inventory the components of the corresponding IHS hosting the processor (208). The inventory may include, for example, the type and model of each hardware component, versions of firmware or other code executing on the hardware components, and/or information regarding hardware components of the corresponding IHS that may be allocated to form LCSs and/or composed IHSs.

In one or more embodiments, the composition manager (and/or the orchestrator (e.g., 140, FIG. 1)) may obtain composition requests from one or more entities (e.g., users of the clients (e.g., 110, FIG. 1), management entities tasked with instantiating LCSs and/or composed IHSs, etc.) as pre-loaded instructions and/or via other methods. The composition requests may specify, for example, the types and quantities of computing resources to be allocated to an LCS and/or a composed IHS.

To prepare and present resources to compute resource sets based on the composition requests, the processor (208) may implement, for example, abstraction, indirection, virtualization, mapping, emulation, and/or other types of services that may be used to present any type of resources as a resource that is capable of bare metal utilization by compute resource sets. To provide these services, the composition manager may invoke the functionality of the physical resources manager, the emulated resources manager, and/or the virtual resources manager.

Additionally, the processor (208) may take into account an importance of completion of workloads when preparing and presenting resources. For example, some workloads that may be performed by various hardware devices may be critical (e.g., high-availability workloads) to the computer-implemented services to be provided by an LCS and/or a composed IHS. In such a scenario, the processor (208) may over allocate resources (e.g., beyond that requested by a compute resource set) for performance of the workloads so that at least two instances of the workloads may be performed using duplicative resources. By doing so, it may be more likely that at least one of the workloads will be completed successfully.

In one or more embodiments, when presenting the resources to the compute resource sets, the processor (208) may present the resources using an emulated data plane. For example, the processor (208) may receive bare metal communications and respond in a manner consistent with responses of corresponding bare metal devices (e.g., memory). When doing so, the processor (208) may translate the communications into actions. The actions may be provided to the hardware devices used by the processor (208) to present the bare metal resources to the compute resource set(s). In turn, the hardware devices may perform the actions which results in an LCS and/or a composed IHS providing desired computer-implemented services.

In some scenarios, multiple processors may cooperate to present bare metal resources to a compute resource set. For example, a single IHS (e.g., 200) may not include sufficient hardware devices to present a quantity and/or type of resources to a compute resource set as specified by a composition request (e.g., present two storage devices to a compute resource set when a single IHS only includes a single storage device). In this scenario, a second processor of a second IHS operably connected to the processor (208) tasked with presenting the resources to a compute resource set may prepare one of its storage devices for presentation. Once prepared, the second processor may communicate with the processor (208) to enable the processor (208) to present the prepared storage device (i.e., the storage/memory resource in the second IHS) to the compute resource set. By doing so, resources from multiple IHSs may be aggregated to present a desired quantity of resources to compute resource set(s) to form a "composed" LCS and/or a composed IHS. By forming LCSs and/or composed IHSs as discussed above, embodiments of the invention may provide a system that is able to effectively utilize distributed resources across a range of devices to provide computer-implemented services.

In one or more embodiments, the physical resources manager may manage presentation of resources to compute resource sets. For example, the physical resources manager may generate, for example, translation tables that specify actions to be performed in response to bare metal communications obtained from compute resource sets. The translation tables may be used to take action in response to communications from compute resource sets.

In one or more embodiments, the physical resources manager may generate the translation tables based on the components of the compute resource sets, allocations or other types of commands/communications obtained from the compute resource sets, and the resources of the IHS (200) allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager may monitor this process, respond appropriately, and generate the translation table based on these commands and the resources available to service these bare metal commands/communications.

In one or more embodiments, the emulated resources manager may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager may generate emulation tables that map bare metal communications obtained from a compute resource set to actions that are compatible with resources allocated to provide bare metal resources to the compute resource sets.

In one or more embodiments, the virtual resources manager may manage virtualized resources that may be allocated to provide bare metal resources to compute resource sets. For example, the virtual resources manager may include hypervisor functionality to virtualized hardware resources and allocate portions of the virtualized resources for use in providing bare metal resources.

While the physical resources manager, emulated resources manager, and virtual resources manager have been described as generating tables, these components of the processor (208) may generate other types of data structures or utilize different management models to provide their respective functionalities without departing from the scope of the invention. The functionalities of the physical resources manager, emulated resources manager, and virtual resources manager may be utilized in isolation and/or combination to provide bare metal resources to compute resource sets. By doing so, the processor (208) may address compatibility issues, sizing issues to match available resources to those that are to be allocated, and/or other issues to enable bare metal resources to be presented to compute resource sets.

In one or more embodiments, when providing bare metal resources, the composition manager may invoke the functionality of the physical resources manager, emulated resources manager, and/or virtual resources manager. Consequently, resources may be presented as bare metal resources via pass-through (i.e., forwarding I/O from compute resource sets to hardware devices), bare metal resource addressing of virtualized resources, and/or as emulated resources compatible with the hardware components of the compute resource set. The functionality of the physical resources manager, emulated resources manager, and virtual resources manager may be invoked using any communication model including, for example, message passing, state sharing, memory sharing, etc.

In one or more embodiments, the operation manager may manage the general operation of the processor (208). For example, the operation manager may manage the resources of the processor (208). The composition manager, physical resources manager, emulated resources manager, virtual resources manager, and/or other entities hosted by the processor (208) may call or otherwise utilize the operation manager to obtain appropriate resources (e.g., processing resources, memory resources, storage, communications, etc.) to provide their functionalities.

In one or more embodiments, the hardware resource services may facilitate use of the hardware components of any number of hardware resource sets. For example, the hardware resource services may include a driver functionality to appropriately communicate with the hardware devices of hardware resource sets. The hardware resource services may be invoked by, for example, the operation manager.

While the processor (208) has been illustrated and described as including a limited number of specific components, the processor (208) may include additional, fewer, and/or different components without departing from the scope of the invention.

One of ordinary skill will appreciate that the processor (208) (including its aforementioned components) may perform other functionalities without departing from the scope of the invention. When providing its functionalities, the processor (208) may perform all, or a portion, of the methods illustrated in FIG. 3.1. The processor (208) may be implemented using hardware (e.g., an integrated circuit), software, or any combination thereof.

In one or more embodiments, when two or more components are referred to as "coupled" to one another, such term indicates that such two or more components are in electronic communication or mechanical communication, as applicable, whether connected directly or indirectly, with or without intervening components.

In one or more embodiments, the storage/memory resource (204) may have or provide at least the functionalities and/or characteristics of the storage or memory resources described above in reference to FIG. 1. The storage/memory resource (204) may include any instrumentality or aggregation of instrumentalities that may retain data (e.g., operating system (206) data, tamper-protected data, application data, etc.), program instructions, applications, and/or firmware (temporarily or permanently). In one or more embodiments, software and/or firmware stored within the storage/memory resource (204) may be loaded into the processor (208) and executed during operation of the IHS (200).

Further, the storage/memory resource (204) may include, without limitation, (i) storage media such as a direct access storage device (e.g., an HDD or a floppy disk), a sequential access storage device (e.g., a tape disk drive), compact disk, CD-ROM, DVD, RAM, read-only memory (ROM), electrically erasable programmable read-only memory (EEPROM), magnetic storage, opto-magnetic storage, and/or volatile or non-volatile memory (e.g., flash memory) that retains data after power to the IHS (200) is turned off; (ii) communications media such as wires, optical fibers, microwaves, radio waves, and other electromagnetic and/or optical carriers; and/or any combination of thereof.

Although the storage/memory resource (204) is depicted as integral to the host system (202), in some embodiments, all or a portion of the storage/memory resource (204) may reside external to the host system (202).

In one or more embodiments, the operating system (206) may include any program of executable instructions (or aggregation of programs of executable instructions) configured to manage and/or control the allocation and usage of hardware resources such as memory, processor time, disk space, and input/output devices, and provide an interface between such hardware resources and applications hosted by the operating system (206). Further, the operating system (206) may include all or a portion of a network stack for network communication via a network interface (e.g., the network interface (212) for communication over a data network (e.g., an in-band connection (230))).

In one or more embodiments, active portions of the operating system (206) may be transferred to the storage/memory resource (204) for execution by the processor (208). Although the operating system (206) is shown in FIG. 2.1 as stored in the storage/memory resource (204), in some embodiments, the operating system (206) may be stored in external storage media accessible to the processor (208), and active portions of the operating system (206) may be transferred from such external storage media to the storage/memory resource (204) for execution by the processor (208).

In one or more embodiments, the firmware stored in the storage/memory resource (204) may include power profile data and thermal profile data for certain hardware devices (e.g., the processor (208), the BIOS (210), the network interface (212), I/O controllers, etc.). Further, the storage/memory resource (204) may include a UEFI interface (not shown) for accessing the BIOS (210) as well as updating the BIOS (210). In most cases, the UEFI interface may provide a software interface between the operating system (206) and the BIOS (210), and may support remote diagnostics and repair of hardware devices, even with no OS is installed.

In one or more embodiments, the I/O controllers (not shown) may manage the operation(s) of one or more I/O device(s) (connected/coupled to the IHS (200)), for example (but not limited to): a keyboard, a mouse, a touch screen, a microphone, a monitor or a display device, a camera, an optical reader, a USB, a card reader, a personal computer memory card international association (PCMCIA) slot, a high-definition multimedia interface (HDMI), etc.

In one or more embodiments, the storage/memory resource (204) may store data structures including, for example (but not limited to): composed system data, a resource map, a computing resource health repository, etc. Each of these data structures is discussed below.

In one or more embodiments, the composed system data may be implemented using one or more data structures that includes information regarding LCSs and/or composed IHSs. For example, the composed system data may specify identifiers of LCSs (260) and/or composed IHSs, and resources that have been allocated to the LCSs (260) and/or composed IHSs.

The composed system data may also include information regarding the operation of the LCSs (260) and/or composed IHSs. The information (which may be utilized to manage the operation of the LCSs and/or composed IHSs) may include (or specify), for example (but not limited to): workload performance data, resource utilization rates over time, management models employed by the processor (208), etc. For example, the composed system data may include information regarding duplicative data stored for data integrity purposes, redundantly performed workloads to meet high-availability service requirements, encryption schemes utilized to prevent unauthorized access of data, etc.

The composed system data may be maintained by, for example, the composition manager. For example, the composition manager may add, remove, and/or modify information included in the composed system data to cause the information included in the composed system data to reflect the state of the LCSs (260) and/or composed IHSs. The data structures of the composed system data may be implemented using, for example, lists, tables, unstructured data, databases, etc. While illustrated as being stored locally, the composed system data may be stored remotely and may be distributed across any number of devices without departing from the scope of the invention.

In one or more embodiments, the resource map may be implemented using one or more data structures that include information regarding resources of the IHS (200) and/or other IHSs. For example, the resource map may specify the type and/or quantity of resources (e.g., hardware devices, virtualized devices, etc.) available for allocation and/or that are already allocated to LCSs (e.g., 260) and/or composed IHSs. The resource map may be used to provide data to management entities such as the orchestrator (140).

The data structures of the resource map may be implemented using, for example, lists, tables, unstructured data, databases, etc. While illustrated as being stored locally, the resource map may be stored remotely and may be distributed across any number of devices without departing from the scope of the invention. The resource map may be maintained by, for example, the composition manager. For example, the composition manager may add, remove, and/or modify information included in the resource map to cause the information included in the resource map to reflect the state of the IHS (200) and/or other IHSs.

In one or more embodiments, the computing resource health repository may be implemented using one or more data structures that includes information regarding the health of hardware devices that provide computing resources to LCSs and/or composed IHSs. For example, the computing resource health repository may specify operation errors, health state information, temperature, and/or other types of information indicative of the health of hardware devices.

The computing resource health repository may specify the health states of hardware devices via any method. For example, the computing resource health repository may indicate whether, based on the aggregated health information, that the hardware devices are or are not in compromised states. A compromised health state may indicate that the corresponding hardware device has already or is likely to, in the future, be no longer able to provide the computing resources that it has previously provided. The health state determination may be made via any method based on the aggregated health information without departing from the scope of the invention. For example, the health state determination may be made based on heuristic information regarding previously observed relationships between health information and future outcomes (e.g., current health information being predictive of whether a hardware device will be likely to provide computing resources in the future).

The computing resource health repository may be maintained by, for example, the composition manager. For example, the composition manager may add, remove, and/or modify information included in the computing resource health repository to cause the information included in the computing resource health repository to reflect the current health of the hardware devices that provide computing resources to LCSs and/or composed IHSs.

The data structures of the computing resource health repository may be implemented using, for example, lists, tables, unstructured data, databases, etc. While illustrated as being stored locally, the computing resource health repository may be stored remotely and may be distributed across any number of devices without departing from the scope of the invention.

While the storage/memory resource (204) has been illustrated and described as including a limited number and type of data, the storage/memory resource (204) may store additional, less, and/or different data without departing from the scope of the invention.

One of ordinary skill will appreciate that the storage/memory resource (204) may perform other functionalities without departing from the scope of the invention. When providing its functionalities, the storage/memory resource (204) may perform all, or a portion, of the methods illustrated in FIGS. 3.1 and 3.2. The storage/memory resource (204) may be implemented using hardware, software, or any combination thereof.

In one or more embodiments, the BIOS (210) may refer to any system, device, or apparatus configured to (i) identify, test, and/or initialize information handling resources (e.g., the network interface (212), other hardware components of the IHS (200), etc.) of the IHS (200) (typically during boot up or power on of the IHS (200)), and/or initialize interoperation of the IHS (200) with other IHSs, and (ii) load a boot loader or an OS (e.g., the operating system (206) from a mass storage device). The BIOS (210) may be implemented as a program of instructions (e.g., firmware, a firmware image, etc.) that may be read by and executed on the processor (208) to perform the functionalities of the BIOS (210).

In one or more embodiments, the BIOS (210) may include boot firmware configured to be the first code executed by the processor (208) when the IHS (200) is booted and/or powered on. As part of its initialization functionality, the boot firmware may be configured to set hardware components of the IHS (200) into a known state, so that one or more applications (e.g., the operating system (206) or other applications) stored on the storage/memory resource (204) may be executed by the processor (208) to provide computer-implemented services to one or more users of the clients (e.g., 110, FIG. 1). Further, the BIOS (210) may provide an abstraction layer for some of the hardware components of the IHS (200), such as a consistent way for applications and OSs to interact with a keyboard, a display, and other I/O components.

One of ordinary skill will appreciate that the BIOS (210) may perform other functionalities without departing from the scope of the invention. When providing its functionalities, the BIOS (210) may perform all, or a portion, of the methods illustrated in FIG. 3.1. The BIOS (210) may be implemented using hardware, software, or any combination thereof.

In one or more embodiments, as being an in-band network interface, the network interface (212) may include one or more systems, apparatuses, or devices that enable the host system (202) to communicate and/or interface with other devices (including other host systems), services, and components that are located externally to the IHS (200). These devices, services, and components, such as a system management module (not shown), may interface with the host system (202) via an external network (e.g., a shared network, a data network, an in-band network, etc.), such as the in-band connection (230) (that provides in-band access), which may include a LAN, a WAN, a PAN, the Internet, etc.

In one or more embodiments, the network interface (212) may enable the host system (202) to communicate using any suitable transmission protocol and/or standard. The network interface (212) may include, for example (but not limited to): a NIC, a 20 gigabit Ethernet network interface, etc. In one or more embodiments, the network interface (212) may be enabled as a LAN-on-motherboard (LOM) card.

One of ordinary skill will appreciate that the network interface (212) may perform other functionalities without departing from the scope of the invention. When providing its functionalities, the network interface (212) may perform all, or a portion, of the methods illustrated in FIG. 3.1. The network interface (212) may be implemented using hardware, software, or any combination thereof.

In one or more embodiments, as being a specialized processing unit (if, for example, the IHS (200) is a server) or an embedded controller (if, for example, IHS (200) is a user-level device) different form a CPU (e.g., the processor (208)), the BMC (220) may be configured to provide management/monitoring functionalities (e.g., power management, cooling management, etc.) for the management of the IHS (200) (e.g., the hardware components and firmware in the IHS (200), such as the BIOS firmware, the UEFI firmware, etc., apart from the management of the LCSs (260)). Such management may be made even if the IHS (200) is powered off or powered down to a standby state. The BMC (220) may also (i) determine when one or more computing components are powered up. (ii) be programmed using a firmware stack (e.g., an iDRAC® firmware stack) that configures the BMC (220) for performing out-of-band (e.g., external to the BIOS (210)) hardware management tasks, and (iii) collectively provide a system for monitoring the operations of the IHS (200) as well as controlling certain aspects of the IHS (200) for ensuring its proper operation.

In one or more embodiments, the BMC (220) may include (or may be an integral part of), for example (but not limited to): a CMC, a remote access controller (e.g., a DRAC® or an iDRAC®), one-time programmable (OTP) memory (e.g., special non-volatile memory that permits the one-time write of data therein-thereby enabling immutable data storage), a boot loader, etc. The BMC (220) may be accessed by an administrator of the IHS (220) via a dedicated network connection (i.e., the out-of-band connection (234)) or a shared network connection (i.e., the in-band connection (230)).

In one or more embodiments, as shown in FIG. 2.1, the BMC (220) may be a part of an integrated circuit or a chipset within the IHS (200). Separately, the BMC (220) may operate on a separate power plane from other components in the IHS (200). Thus, the BMC (220) may communicate with the corresponding management system via the network interface (224) while the resources/components of the IHS (200) are powered off.

In one or more embodiments, the boot loader may refer to a boot manager, a boot program, an initial program loader (IPL), or a vendor-proprietary image that has a functionality to, e.g.: (i) load a user's kernel from persistent storage into the main memory of the IHS (200), (ii) perform security checks for one or more hardware components of the IHS (200), (iii) guard the device state of one or more hardware components of the IHS (200), (iv) boot the IHS (200), (v) ensure that all relevant OS system data and other applications are loaded into the main memory of the IHS (200) (and ready to execute) when the IHS (200) is started, (vi) based on (v), irrevocably transfer control to the operating system (206) and terminate itself, (vii) include any type of executable code for launching or booting a custom BMC firmware stack on the BMC (220), (viii) include logic for receiving user input for selecting which operational parameters (discussed below) may be monitored and/or processed by a coprocessor, and (ix) include a configuration file that may be edited for selecting (by a user) which operational parameters may be monitored and which operational parameters may be managed by a coprocessor.

In one or more embodiments, as being an out-of-band management network interface (which is separate from and physically isolated from the network interface (212) and/or other embedded resources), the network interface (224) may include one or more systems, apparatuses, or devices that enable the BMC (220) to communicate and/or interface with other devices, services, and components that are located externally to the IHS (200). These devices, services, and components, such as a system management module, may interface with the BMC (220) via an external network (e.g., a management network, a dedicated network, an out-of-band network, etc.), such as the out-of-band connection (234) that provides out-of-band access (e.g., operations performed prior to execution of the BIOS (210) to initialize operation of the IHS (200)).

In one or more embodiments, the network interface (224) may enable the BMC (220) to communicate using any suitable transmission protocol and/or standard. The network interface (224) may include, for example (but not limited to): a network interface card, a 30 gigabit Ethernet network interface, etc. In one or more embodiments, the network interface (224) may be enabled as a LAN-on-motherboard (LOM) card.

In one or more embodiments, the network interface (224) may be the same type of device as the network interface (212), or in other embodiments, the network interface (224) may be a device of a different type.

One of ordinary skill will appreciate that the network interface (224) may perform other functionalities without departing from the scope of the invention. When providing its functionalities, the network interface (224) may perform all, or a portion, of the methods illustrated in FIG. 3.1. The network interface (224) may be implemented using hardware, software, or any combination thereof.

In one or more embodiments, the IHS (200) may include one or more additional hardware components, not shown for clarity. For example, the IHS (200) may include additional storage devices (that may have or provide functionalities and/or characteristics of the storage or memory resources described above in reference to FIG. 1) for storing machine-executable code (e.g., software, data, etc.), a platform controller hub (PCH) (e.g., to control certain data paths (e.g., system buses, data flow, etc.) between at least the processor (208) and peripheral devices), one or more communications ports for communicating with external devices as well as various I/O devices, one or more power supply units (PSUs) (e.g., to power hardware components of the IHS (200)), different types of sensors (e.g., temperature sensors, voltage sensors, etc.) (that report to the BMC (220) about parameters such as temperature, cooling fan speeds, a power status, an OS status, etc.), additional CPUs and bus controllers, a display device, one or more environmental control components (e.g., cooling fans), one or more fan controllers within the BMC (220), an additional processor (e.g., a coprocessor) within the BMC (220), a BMC update module, and a component firmware update module (located, for example, within the processor (208)).

In one or more embodiments, the BMC (220) may monitor one or more sensors and send alerts to an administrator of the IHS (200) if any of the parameters do not stay within predetermined limits, indicating a potential failure of the IHS (200). The administrator may also remotely communicate with the BMC (220) to take particular corrective actions, such as resetting or power cycling the IHS (200).

In one or more embodiments, the BIOS microvisor loader (215) may include functionality to, e.g.: (i) bridge an initial bootstrap power on firmware to the microvisor (240) and (ii) load the microvisor (240) (and its components).

One of ordinary skill will appreciate that the BIOS microvisor loader (215) may perform other functionalities without departing from the scope of the invention. When providing its functionalities, the BIOS microvisor loader (215) may perform all, or a portion, of the methods illustrated in FIG. 3.1. The BIOS microvisor loader (215) may be implemented using hardware, software, or any combination thereof.

In one or more embodiments, an LCS (e.g., LCS A (260A), LCS B (260B), etc.) (or a "composed" LCS) may be a logical entity (e.g., a VM or an instance that the components of which may be distributed across one or more IHSs (e.g., 120A, 120B, etc., FIG. 1)) that has exclusive use over a quantity of computing resources. As discussed above, computing resources from multiple IHSs may be allocated/mapped/delegated to an LCS (e.g., 260A, 260B, etc.) thereby enabling an LCS to utilize computing resources (e.g., in a virtualized form such as vCPU, vGPU, vDPU, etc., where the LCS does not have ownership of those "mapped" resources) from any number of IHS for performance of corresponding computer-implemented services. Each of the LCSs (260) may be performing similar or different processes at the same time.

In one or more embodiments, the LCSs (260) and the microvisor (240) may not be aware of (and may not have access to) the BMC (220). Similarly, the BMC (220) may not be aware of the LCSs (260) and the microvisor (240). In particular, the microvisor (240) may mask its presence (e.g., may make itself transparent to other components, applications, and/or end-users of the IHS (200), may make itself indistinguishable from the BIOS (210) because the microvisor (240) may be loaded as a BIOS executable component to obfuscate malicious users, etc.) and may mask the presence of other users/guests/tenants (that are also using the LCSs (260)) from particular tenants (e.g., for security measures). Additionally, the LCSs (260) may not be aware of the orchestrator (e.g., 140, FIG. 1) and the other components of the IHS (200), and where the mapped resources are mapped from (e.g., so that LCSs (260) may operate in a truly abstracted manner from the management of the components of the IHS (200)).

Referring to FIG. 2.2, in one or more embodiments, an LCS may be (i) a "basic" LCS and (ii) a "nested" LCS. A basic LCS (e.g., 260A, FIG. 2.2) may include, at least, a guest BIOS (e.g., 262A, FIG. 2.2), an LCS kernel (e.g., 264A, FIG. 2.2), an advanced configuration and power interface (ACPI, not shown) (e.g., a way that the corresponding guest BIOS describes the LCS' configuration to the corresponding LCS kernel), and one or more applications (e.g., 266A, FIG. 2.2). A nested LCS (e.g., 260B, FIG. 2.2) may include, at least, a guest BIOS (e.g., 262B, FIG. 2.2), an LCS kernel (e.g., 264B, FIG. 2.2), one or more applications (e.g., 266B, FIG. 2.2), an ACPI, and one or more sub-LCSs (e.g., 267, FIG. 2.2) (where the corresponding LCS kernel may emulate a subset of lower privilege level LCSs within the actual LCS).

In one or more embodiments, as being a logical intelligence (e.g., a computing entity that supports virtualized application environments and/or provides virtualized application services), a guest BIOS (e.g., 262A, 262B, etc., FIG. 2.2) may provide less, the same, or more functionalities and/or services (described above) comparing to the BIOS (210). One of ordinary skill will appreciate that the guest BIOS may perform other functionalities without departing from the scope of the invention.

In one or more embodiments, an LCS kernel (e.g., 264A, 264B, etc., FIG. 2.2) may include functionality to, e.g.: (i) coordinate operations among applications (e.g., 266A, FIG. 2.2) executing on the corresponding LCS to facilitate the proper use of the LCS, (ii) orchestrate services (e.g., application services provided the applications) to the users/guests of the corresponding LCS, (iii) host instances of databases, email servers, and/or other applications that are accessible to users/guests of the corresponding LCS, (iv) oversee each LCS component's operations (e.g., to that extent, the LCS kernel may support fundamental LCS functions; schedule tasks; mediate interactivity between logical LCS subcomponents (e.g., 267, FIG. 2.2); allocate delegated/assigned resources to each LCS component; and execute or invoke other computer programs executing on the corresponding LCS). One of ordinary skill will appreciate that the LCS kernel may perform other functionalities without departing from the scope of the invention.

In one or more embodiments, an application of applications (e.g., 266A, FIG. 2.2) is software executing on the corresponding LCS (e.g., 260A, FIG. 2.2) that may include instructions which, when executed by the corresponding LCS kernel (e.g., 264A, FIG. 2.2), initiate the performance of one or more operations of components of the corresponding LCS. An application of applications (e.g., 266A, FIG. 2.2) may provide less, the same, or more functionalities and/or services comparing applications executing on a client of the clients (e.g., 110, FIG. 1). One of ordinary skill will appreciate that the application may perform other functionalities without departing from the scope of the invention.

In one or more embodiments, as being a lightweight and highly specialized control module, the microvisor (240) may include, at least, a microvisor kernel (242), an LCS BIOS helper (244), a security manager (246), a system management mode (SMM) handler (248), and a microvisor API (249). Each of the components of the microvisor is discussed below.

In one or more embodiments, the microvisor kernel (242) may include functionality to, e.g.: (i) coordinate operations among applications (e.g., 252, FIG. 2.2) executing on the microvisor user space (e.g., 250, FIG. 2.2) to facilitate the proper use of the LCSs (260); (ii) in conjunction with the security manager (246), monitor data (which may include read and write requests) traversing the LCSs (260) and may intercept, modify, and/or otherwise alter that data based on one or more predetermined conditions; (iii) based on (ii) and in conjunction with the security manager (246), redirect data by intercepting and modifying that data to specify a recipient different than normally specified; (iv) in conjunction with the security manager (246) and the orchestrator (e.g., 140, FIG. 1), oversee and facilitate operation of each LCS (e.g., to that extent, the microvisor kernel may support fundamental kernel functions; schedule tasks; mediate interactivity between microvisor components; allocate mapped resources to the corresponding LCS(s); and execute or invoke other computer programs executing on the corresponding LCS(s)); (v) based on a CT (described above in reference to FIG. 1), provision/initialize/remove LCSs (260) and manage their operations (e.g., managing services to be provided by an LCS based on the validity and user level of a user, managing workload placement among LCSs, tracking capabilities and resource availabilities on each LCS, etc.); (vi) if an LCS needs to be orchestrated from a different IHS (e.g., because of a resource contention in the current IHS, because of a device failure in the current IHS, etc.), relocate/migrate the LCS to another suitable IHS (e.g., to provide workload mobility among IHSs and to maintain consistency of the corresponding workload); (vii) provide tenant obfuscation functions such as preventing access to certain direct memory access (DMA) targets and/or hyper call instructions (e.g., to be able to support multi-tenancy LCS usage); (viii) communicate with the orchestrator (e.g., 140, FIG. 1) via the microvisor API (249) (a) to receive one or more CTs and/or other instructions (where the orchestrator is responsible for direction of access and provisioning of the LCSs), or (b) to provide telemetry data (e.g., after monitoring various performance and health information of each LCS, providing the information as telemetry data) with respect to each LCS (e.g., so that the orchestrator may manage the LCSs based on the required SLA and QoS compliance requirements); (ix) in conjunction with the microvisor user space (250), execute any computer-readable program code that connects the clients (e.g., 110, FIG. 1) to LCSs; (x) provide a remotely-accessible user interface to an administrator to manage the configuration of one or more LCSs (e.g., a management terminal displayed on the microvisor user space (250) may allow an administrator to perform one or more LCS management functions via a secure management session); (xi) in conjunction with the orchestrator, control the lifecycle of the LCSs (260); (xii) perform power operations on the LCSs (i.e., power on, power-off, suspend, resume, checkpoint, etc.); (xiii) keep track of (in conjunction with the orchestrator) active and inactive LCSs; (xiv) enforce one or more SLA and QoS constraints (described above in reference to FIG. 1) on one or more LCSs (260) (for example, 15% of computing resources of one or more IHSs are assigned to Tenant R; however, Tenant R is only using 50% of the assigned computing resources to perform production workloads and the remaining portion of the assigned computing resources are trapped (e.g., not usable by other users who desperately need additional resources for their production workloads), where, to prevent that and to manage access to shared computing resources, the microvisor kernel may enforce SLA and QoS constraints/policies); (xv) monitor the performance of LCSs (with respect to, for example, network latency, the number of open ports, the number of dropped packets, storage I/O latency, end-to-end I/O user latency, data throughput, remaining storage capacity, processing rate, memory write rates, memory read rates, etc.) to obtain/collect/assess SLA and QoS adherence results of the LCSs (for example, to infer whether the LCSs satisfy or fail to satisfy the SLA and QoS requirements (or the requirements set by users/tenants/administrators) over a monitoring time interval); (xvi) provide a focused multi-tenant management (e.g., providing a complete isolation among guest instances (e.g., the LCSs) where each LCs has its own components (see FIG. 2.2), enforcing sharing of physical and logical resources within an LCS, provisioning access to tenants (to the corresponding LCSs) and specifying what resources those tenants have access to through policies, etc.); (xvii) obtain composition requests for one or more LCSs from the orchestrator; and (xviii) in conjunction with the orchestrator, add/remove/modify resources mapped to the LCSs dynamically in accordance with workloads being performed by the LCSs. One of ordinary skill will appreciate that the microvisor kernel (242) may perform other functionalities without departing from the scope of the invention.

In one or more embodiments, the LCS BIOS helper (244) may include functionality to, upon receiving the microvisor kernel's (242) request (after the corresponding LCS is provisioned), initiate a guest BIOS of the corresponding LCS (e.g., 260A, 260B, etc.) to boot the corresponding LCS. One of ordinary skill will appreciate that the LCS BIOS helper (244) may perform other functionalities without departing from the scope of the invention.

In one or more embodiments, the security manager (246) may include functionality to, e.g.: (i) be responsible for the authentication of users/tenants of the clients (e.g., 110, FIG. 1) and direct those users to their respective LCSs (260); (ii) keep track of (in conjunction with the microvisor kernel (242)) active and inactive LCSs (e.g., when a user sends a request to connect to an LCS, the security manager (246) may provide the user with an idle LCS; when a user disconnects from a given LCS, the security manager (246) may update the status (of the LCS) to an "inactive" state; etc.); (iii) prevent unauthorized/illicit access events directed to the LCSs (260) (e.g., by performing periodic cyclic redundancy checks); (iv) monitor (or track), over a network (e.g., 130, FIG. 1), communication traffic (including communication traffic logins) between an LCS and a client to obtain a first dataset (described below); (v) monitor, over the network, activities on an LCS to obtain a second dataset (e.g., an activity record that documents an activity in a configurable level of detail (described below)); (vi) intercept, scrutinize, and accept/reject a request/call (e.g., an encrypted request, a network access request to initiate a hacking/hijacking attack, a data access request, an interrupt exist, an SMM call, a system management interrupt, an invalid instruction, etc.) received from an entity (e.g., a valid/trusted client, a compromised user, an invalid user, a malicious insider, a credential/data thief, a negligent insider, etc.) before it arrives its targeted destination; (vii) based on (vi) and configuration parameters (e.g., a request ruleset, a response ruleset, etc., described below), determine as to whether the intercepted request is valid; (viii) based on the determination performed in (vii), infer (or identify), for example, a user that initiated the request has the necessary credentials (e.g., a required level of user priority) and/or is authorized to access data, the intercepted request is a valid request (e.g., the request sent by an authorized/trusted user, the request is an authentic request, etc.) or an invalid request (e.g., the request is related to a network attack initiated by a hacker), etc.; (ix) based on (viii), tag the request as an invalid request (e.g., an abnormal request) and reject (by taking a preventive/proactive policy action) the invalid request for maximum data security, integrity, and availability (so that (a) unauthorized entities cannot access to business-critical data within the corresponding LCS, and (b) a data transfer operation may not be initiated unless and until the security manager (246) validates the request); (x) based on (ix), send a fake response (or a fake notification) to the malicious sender (e.g., the hacker) that initiated the invalid request; (xi) based on (viii), tag the request as a valid request and process the valid request; (xii) receive outgoing network traffic (e.g., data packets or other communication protocol compliant data structures) from the corresponding LCS that is planned to be transmitted to another component; (xiii) based on (xii), verify (and filter some of the outgoing network traffic if necessary) that the outgoing network traffic satisfies one or more attribution rules specified in the configuration parameters (e.g., verify the validity of the outgoing network traffic); (xiv) based on the verification performed in (xiii), initiate transmission of the outgoing network traffic to the corresponding component; (xv) obtain (or receive) telemetry data (e.g., logs, alerts (e.g., predictive alerts, proactive alerts, technical alerts, etc.) triggered at the corresponding LCS, etc.) associated with one or more components of an LCS (to infer, for example, a change in the health status of the LCS (e.g., in real-time)) because of an unexpected event (e.g., a security incident is reported)); and (xvi) send the aforementioned data (e.g., the first dataset, the second dataset, intercepted requests and/or responses, credentials of a user, tagging information of a request and/or are response, characteristics of outgoing network traffic, obtained telemetry data and resource utilization levels of an edge device, performance and health details of each component of an edge device, etc.) to the microvisor kernel (242). One of ordinary skill will appreciate that the security manager (246) may perform other functionalities without departing from the scope of the invention.

In one or more embodiments, the security manager (246) may include any logic, business rule, function, and/or operation for optimizing, accelerating, or otherwise improving the performance, operation, and/or QoS of outgoing network traffic or the delivery of data packets at the network.

In one or more embodiments, the first dataset may include, for example (but not limited to): a request/call, a type of a request, a response to a request, a type of a response, corresponding response time for a request, a size of a request, a size of a response, etc. The request and response to the request may be communicated over a network (e.g., 130, FIG. 1). In one or more embodiments, corresponding response time may be a period of time, with a definite start and end, within which a response process is set to be completed. Further, the security manager (246) may periodically obtain a first dataset from communication/network traffic. The security manager (246) may also obtain a first dataset from network traffic in real-time.

In one or more embodiments, the second dataset may include (or document the following metadata), for example (but not limited to): date and time an application window is opened, a name/identifier of an application being used by a user, information in a title bar of an application, a configurable amount of content in an application window, a user account used to access an application, a file system path in which content was stored, a file system path to which content was stored, data being accessed/transferred via a network connection, etc. Accordingly, the second dataset may be a string or series of strings that includes (file system) metadata that documents user activities.

In one or more embodiments, a request ruleset may specify (or include), for example (but not limited to): a request decryption rule, a request authentication rule (which may be utilized by the security manager (246) to validate a request), a type of an allowable network communication/protocol between an entity and components of an LCS, a particular header that needs to be included in an intercepted request, a smart contract that defines under what conditions a request should be granted, a smart contract that defines under what conditions data should be transferred to the microvisor kernel (242), one or more rules/policies for detecting and blocking illegitimate requests and application-based attacks, one or more rules/policies to protect components of an LCS and/or the microvisor (240) against various classes and types of Internet-based vulnerabilities, etc.

In one or more embodiments, a response ruleset may include (or specify), for example (but not limited to): an attribution rule (e.g., a type/format of an asset (e.g., a ".pdf" file, a ".doc" file, a ".jpeg" file, etc.), a size of an asset, a content of an asset (e.g., a legal document, an engineering design document, etc.), an identifier of an asset, etc.), an asset sensitivity/criticality threshold that needs to be applied for all outgoing network traffic, etc.

In one or more embodiments, the authentication related rules included in the response ruleset and request ruleset may be the same across all microvisors of an organization to perform a uniform and successful authentication process. As shown in FIG. 2.1, the microvisor (240) is deployed to one of the IHSs. However, the system (e.g., 100, FIG. 1) may include additional microvisors that may be deployed to other IHSs of the system to perform all, or a portion, of the methods illustrated in FIGS. 3.1 and 3.2.

In one or more embodiments, the SMM handler (248) may include functionality to trap any type of valid or invalid SMM requests and/or any type of specialized interrupts (in conjunction with the security manager (246)). One of ordinary skill will appreciate that the SMM handler (248) may perform other functionalities without departing from the scope of the invention. As indicated in FIG. 2.1, the SMM handler (248) is owned and managed by the microvisor (240), and the SMM handler (248) is directly interfacing with the microvisor kernel (242).

In one or more embodiments, the microvisor API (249) may include functionality to, e.g.: (i) provide an interface (e.g., a communication channel) between the components of the microvisor (240) and other components of the system (e.g., the orchestrator (e.g., 140, FIG. 1)) via the microvisor user space (250) and (ii) provide an interface between the components of the microvisor (240) and an administrator (for management purposes) via the microvisor user space (250). The microvisor API (249) may include interfaces such as, for example, a Redfish host interface and a WSMan host interface (or any other suitable interfacing technology). One of ordinary skill will appreciate that the microvisor API (249) may perform other functionalities without departing from the scope of the invention.

In one or more embodiments, the microvisor user space (250) may be a hardware and/or software environment (e.g., a GUI, an in-band and/or out-of-band network interface, etc.) that generally provides a virtual space in which user-initiated software (e.g., applications (e.g., 252, FIG. 2.2)) and a microvisor agent (e.g., 254, FIG. 2.2) execute. In one or more embodiments, the microvisor agent may include functionality to, e.g.: (i) enable/support one or more microvisor components to communicate/connect and/or interface with other devices, services, and components that are located internally and/or externally to the IHS (200), and (ii) utilize low-level system components for the execution of the applications (e.g., 252, FIG. 2.2).

In one or more embodiments, these devices, services, and components, such as the orchestrator (e.g., 140, FIG. 1), may interface with the microvisor agent (e.g., 254, FIG. 2.2) via an external network (e.g., a management network, a dedicated network, an out-of-band network, a shared network, a data network, an in-band network, etc.), such as the in-band and/or out-of-band connection (232) that provides in-band access and/or out-of-band access.

In one or more embodiments, the microvisor user space (250) may enable the microvisor (240) to communicate using any suitable transmission protocol and/or standard. The microvisor user space (250) may include, for example (but not limited to): a network interface card, a 30 gigabit Ethernet network interface, etc.

In one or more embodiments, an application of applications (e.g., 252, FIG. 2.2) is software executing on the microvisor user space (250) that may include instructions which, when executed by the microvisor agent (e.g., 254, FIG. 2.2), initiate the performance of one or more operations. An application of applications (e.g., 252, FIG. 2.2) may provide less, the same, or more functionalities and/or services comparing applications executing on a client of the clients (e.g., 110, FIG. 1). One of ordinary skill will appreciate that the application may perform other functionalities without departing from the scope of the invention.

While the microvisor (240) has been illustrated and described as including a limited number of specific components, the microvisor (240) may include additional, fewer, and/or different components without departing from the scope of the invention.

One of ordinary skill will appreciate that the microvisor (240) (including its aforementioned components) may perform other functionalities without departing from the scope of the invention. When providing its functionalities, the microvisor (240) may perform all, or a portion, of the methods illustrated in FIGS. 3.3 and 3.3. The microvisor (240) may be implemented using hardware, software, or any combination thereof.

In one or more embodiments, the storage/memory resource (204), the processor (208), the BIOS (210), the network interface (212), the BIOS microvisor loader (215), the LCSs (260), and the BMC (220) may be utilized in isolation and/or in combination to provide the above-discussed functionalities. These functionalities may be invoked using any communication model including, for example, message passing, state sharing, memory sharing, etc. By doing so, the IHS (200) may address issues related to data security, integrity, and availability proactively.

Further, some of the above-discussed functionalities may be performed using available resources or when resources of the IHS (200) are not otherwise being consumed. By performing these functionalities when resources are available, these functionalities may not be burdensome on the resources of the IHS (200) and may not interfere with more primary workloads performed by the IHS (200).

Turning now to FIG. 2.2. FIG. 2.2 shows a ring-level diagram of IHS components (shown in FIG. 2.1) in accordance with one or more embodiments of the invention. In an embodiment of the invention shown in FIG. 2.2, the ring-level diagram specifies three ring levels: (i) "Ring-1" level with high-level privileges, (ii) "Ring 0" level with root privileges, and (iii) "Ring 1" level with no privileges (e.g., unprivileged).

In one or more embodiments, comparing to Ring 0 and Ring 1 components, Ring-1 components may have higher level privileges, in which the higher level privileges may include (or specify), for example (but not limited to): unrestricted access to memory to perform memory allocation, unrestricted access to I/O ports to send or receive network packets, an ability to handle a hardware interrupt, an ability to handle an application exception, an ability to register an interrupt handler (e.g., a low-level handler), etc.

In one or more embodiments, Ring 1 (e.g., unprivileged) components may be (or the following components may run as a Ring 1 component), for example (but not limited to): the applications (e.g., 266A, 266B, etc.), the microvisor user space (250) (including the applications (252) and the microvisor agent (254)), the sub-LCSs (267), etc.

In one or more embodiments, Ring 0 components (with root privileges) may be (or the following components may run as a Ring 0 component), for example (but not limited to): the guest BIOSs (e.g., 262A, 262B, etc.), the LCS kernels (e.g., 264A, 264B, etc.), etc.

In one or more embodiments, Ring-1 components (with high-level privileges) may be (or the following components may run as a Ring-1 component), for example (but not limited to): the BIOS (210), the BIOS microvisor loader (215), the microvisor kernel (242), the LSC BIOS helper (244), the security manager (246), the SMM handler (248), the microvisor API (249), etc. As indicated, (i) the real SMM handling is internal to the microvisor (240) (i.e., the real SMM handling is directly managed by the microvisor (240)), (ii) the LCSs (e.g., 260A, 260B, etc.) do not know they are "guests" because they execute as Ring 0 components, (iii) multi-tenancy is fully managed by the microvisor (240), and (iv) to get the degree of access control, the microvisor (240) may have to run with more sophisticated privileges (e.g., with Ring-1 privileges) than typical OSs and hypervisors.

FIG. 3.1 shows a microvisor's initiation process/method in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed BMC (e.g., 220, FIG. 2.1), BIOS (e.g., 210, FIG. 2.1), and BIOS microvisor loader (e.g., 215, FIG. 2.1). Other components of the system (100) illustrated in FIG. 1 may also execute all or part of the method shown in FIG. 3.1 without departing from the scope of the invention.

In Step 300, a processor of the BMC detects that an IHS (i.e., the IHS in which the BMC and BIOS are located) is powered on by a user (via, for example, an AC or DC event). This detection may trigger the processor of the BMC to perform one or more steps (e.g., when power is first applied to the IHS, the processor of the BMC (in conjunction with the BIOS) starts a sequence of initialization procedures (e.g., a root of trust sequence for the IHS resources/components)).

For example, an AC event may refer to coupling or "plugging in" the IHS to a power source (e.g., a power supply). As yet another example, a DC event may refer to an interaction by the user (or other stimulus) indicating a desire to enable a main power supply and execute the host system of the IHS.

In Step 302, the processor of the BMC (in conjunction with a boot loader (or a "bootstrap loader")) initiates (or allows) the "secure" booting process of the IHS (so that the IHS will be ready to interact with the user (e.g., the IHS will be enabled for operation, device drivers will be installed, OS data will be loaded into the main memory of the IHS, etc.) (or the OS will be capable of executing system applications) when the booting process is completed.

In Step 304, after the booting process is completed (in Step 302), the processor of the BMC executes the BIOS microvisor loader to initiate a microvisor (e.g., 240, FIG. 2.1). In one or more embodiments, the BIOS microvisor loader is responsible for initiating the microvisor so that a microvisor kernel (e.g., 242, FIG. 2.1) of the microvisor may start to operate. For example, the microvisor kernel may load an SMM handler (e.g., 248, FIG. 2.1) and a security manager (e.g., 246, FIG. 2.1).

In one or more embodiments, the method may end following Step 304.

FIG. 3.2 shows an LCS' provisioning process/method in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.2, the method shown in FIG. 3.2 may be executed by, for example, the above-discussed microvisor. Other components of the system (100) illustrated in FIG. 1 may also execute all or part of the method shown in FIG. 3.2 without departing from the scope of the invention.

In Step 306, at a later point-in-time (e.g., after the microvisor is initiated in Step 304 of FIG. 3.1), the microvisor (or more specifically, e.g., a microvisor API (e.g., 249, FIG. 2.1)) issues an API call to a microvisor agent (e.g., 254, FIG. 2.2) to obtain a CT that is required to provision/compose an LCS (e.g., 260A, FIG. 2.1).

In one or more embodiments, prior to Step 306, the microvisor API may obtain an LCS composition request from the microvisor kernel (in which the microvisor kernel may receive the composition request from an administrator (of the orchestrator) via a GUI (e.g., a microvisor user space (e.g., 250, FIG. 2.1))). The composition request may be obtained using any method without departing from the scope of the invention. The composition request may be a data structure specifying that a predetermined type of workload will be performed by the LCS. For example, the composition request may specify an intent of a service to be provided by the LCS (e.g., an intent based request in which the request specifies a desired outcome). As yet another example, the "intent based" composition request may specify one or more applications (e.g., including any type and quantity of applications/resources) to be hosted by the LCS (e.g., in other words, the "intent based" composition request may specify a desired outcome without specifying the resources that are to be used (or to be allocated) to satisfy the request, the methods of managing the resources, and/or models employed to provide for data integrity, security, etc.).

In one or more embodiments, a workload type that will be performed is identified based on the composition request. The workload type may be: (i) identified using information included in the composition request, (ii) heuristically determined (e.g., based on relationships between applications/intent and corresponding workloads that will be performed), and (iii) determined using any other method or type(s) of information, and/or using any combination thereof.

In one or more embodiments, the microvisor kernel may determine whether redundancy is required based on the workload type. Redundancy may be required when an importance of the workload is above a predetermined threshold such that additional computing resources will be allocated to the LCS so that the LCS may perform multiple copies of the workload in parallel when only a single copy of the workload is requested to be executed. By doing so, it may be more likely that at least one copy of the workload will be successfully completed.

To make this determination, the microvisor kernel may compare the identified workload type to a list of workload types that qualify for over allocation of computing resources for redundant workload performance purposes. If the workload type is included in the list, it may be determined that redundancy for the workload is required.

In Step 308, upon receiving the API call, the microvisor (or more specifically, e.g., the microvisor agent) obtains the CT from the orchestrator (or, in one or more embodiments, the LCS composition request received from the orchestrator may already include the CT). In one or more embodiments, the CT may specify a list of computing resources to be allocated to the LCS. For example, the CT may specify computing/processing resources, memory resources, storage resources, compute acceleration resources, communications resources, one or more hardware resource sets, etc. The list may include any type and quantity of computing resources. Further, the CT may specify how the computing resources are to be presented. For example, the composition request may specify virtualization, emulation, etc. for presenting the computing resources.

In one or more embodiments, the CT may also specify how the mapped resources of the LCS should be managed/used (e.g., via a resource management model for a better data integrity, security, management, usability, performance, etc.). For example, the CT may specify levels of redundancy for data storage, data integrity to be employed, levels of security to be employed for resources (e.g., encryption), and/or other information that specifies how an LCS kernel (e.g., 264A, FIG. 2.2) of the LCS should utilize its mapped resources.

In Step 310, the microvisor (or more specifically, e.g., the microvisor agent) sends the CT to the microvisor kernel via the microvisor API.

In Step 312, the microvisor (or more specifically, e.g., the microvisor kernel) provisions/composes (in conjunction with the orchestrator) the LCS based on the CT and mapped/delegated resources (of the LCS). The LCS may include, for example (but not limited to): a guest BIOS, an LCS kernel, one or more applications, one or more sub-LCSs, etc. (see FIG. 2.2). In one or more embodiments, the delegated/allocated resources may enable requested workloads to be redundantly performed. Consequently, if one of the redundantly performed workloads does not complete successfully, the output of another of the redundant workloads that completed successfully may be used to provide appropriate output to satisfy a workload request.

In one or more embodiments, after the LCS is provisioned/instantiated, the health of mapped resources of the LCS may be monitored to ascertain whether the mapped resources have been compromised. If the mapped resources have been compromised, then the microvisor kernel may take action to recompose the mapped resources so that different hardware devices are used to provide the mapped resources. By doing so, the microvisor kernel (in conjunction with the orchestrator) may, automatically and without requiring user intervention, proactively address potential resource compromises that may otherwise reduce the quality of or prevent computer-implemented services from being provided using the LCS. Additionally, by recomposing the mapped resources, the LCS may not need to be overprovisioned with computing resources because compromises in those resources will be automatically remediated. Consequently, the efficiency of computing resource use may be improved by more efficiently allocating (e.g., increasing utilization rate) computing resources.

In Step 314, the microvisor (or more specifically, e.g., an LCS BIOS helper (e.g., 244, FIG. 2.1) initiates a guest BIOS of the "composed" LCS upon receiving the microvisor kernel's request. In one or more embodiments, once the guest BIOS is initiated, the LCS may then be turned over to other entities for management (e.g., the orchestrator) or may be additionally managed by the security manager using any method without departing from the scope of the invention. For example, device images (e.g., data structures including information that may be used to instantiate one or more applications in corresponding operating states) may be used to begin execution of appropriate applications in desired states. By doing so, the LCS may begin to provide desired computer-implemented services. Details of the orchestrator and security manager are described above in reference to FIGS. 1 and 2.1, respectively.

In one or more embodiments, Steps 306-314 may be repeated for any other LCS that needs to be provisioned.

In Step 316, once the LCS is ready to provide computer-implemented services, the microvisor (or more specifically, e.g., the microvisor kernel) may initiate notification of an administrator/user about the provisioned LCS. The notification may be displayed on a GUI of, for example, the corresponding IHS.

In one or more embodiments, the method may end following Step 316.

FIG. 3.3 shows a process/method to preserve the security of the "composed" LCS in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.3, the method shown in FIG. 3.3 may be executed by, for example, the above-discussed microvisor. Other components of the system (100) illustrated in FIG. 1 may also execute all or part of the method shown in FIG. 3.3 without departing from the scope of the invention.

In Step 318, at a later point-in-time (e.g., after the LCS is ready to provide computer-implemented services), the microvisor (or more specifically, e.g., the security manager) monitors (or tracks in real-time), over a network, network/communication traffic (including network traffic logins) between the LCS and a client of the clients (e.g., 110, FIG. 1) to obtain a first dataset. Certain exemplary details of the first dataset have been described above in reference to FIG. 2.1.

In Step 320, the microvisor (or more specifically, e.g., the security manager) monitors (or tracks in real-time), over the network, activities on the LCS to obtain a second dataset. Certain exemplary details of the second dataset have been described above in reference to FIG. 2.1.

In Step 322, by employing a set of linear, non-linear, and/or ML models, the microvisor (or more specifically, e.g., the security manager) may proactively analyze (without the requirement of resource-intensive efforts) the first dataset and second dataset to generate an analysis output. In one or more embodiments, the analysis output may include (or specify), for example (but not limited to): a first malicious activity (e.g., a data exfiltration event that occurred when a malicious user attempted to transfer a sensitive asset to an unauthorized removable storage media), a second malicious activity (e.g., a data loss event that occurred when a malicious user attempted to upload a sensitive asset to an unauthorized file sharing website using an administrator credential), a way of communication (e.g., a one-way communication, a two-way communication, etc.), a data category of source (e.g., personal identification information (PII)), information regarding how the LCS has been utilized by the corresponding entity (e.g., a user, an administrator, etc.), an alert, a type of a workload utilized by a user of the LCS, an SLA set/tested by a user of the LCS, computing resource utilization data regarding the mapped resources of the LCS, a data protection policy implemented/tested by a user of the LCS, a number of each type of a set of data protection policies implemented by a user of the LCS, etc.

In one or more embodiments, if the models that are used by the security manager are not operating properly (e.g., are not providing the above-discussed functionalities), the models may be re-trained using any form of training data and/or the models may be updated periodically as there are improvements in the models (e.g., the models are trained using more appropriate training data).

In one or more embodiments, for example, while analyzing the second dataset (including, at least, malicious user activities, non-malicious user activities, etc.), the security manager may also determine/detect risk scores of assets, risk levels of users, and potential threats. In one or more embodiments, the security manager may implement threat detection algorithms to determine whether the second dataset includes indication of threats.

The threat detection algorithm/model may evaluate the second dataset and if an abnormal (e.g., malicious) activity is detected, the threat detection algorithm may notify the microvisor kernel to issue an alert (e.g., a data loss prevention (DLP) alert). In one or more embodiments, the threat detection algorithm may further quantify the risk resulting from abnormal activities. A higher score (indicating the user is a high-risk user) may indicate an elevated risk thus warranting an alert, whereas a lower score (indicating the user is a low-risk user) may not necessarily trigger an immediate alert. The detection of abnormal activities may be based on a comparison with typical, i.e., expected activities. For example, a user activity (inferred from the second dataset) may be compared to typical behavior of the user, as per the user's role in the organization. Examples for abnormal user behavior incompatible with the user's role include (but not limited to): an engineer copying a customer list to an external storage device, a salesman copying confidential engineering records to an external storage device, etc.

Alternatively, or additionally, the detection of an abnormal user behavior may be based on a comparison with a historical user behavior and/or data from previous insider-threat cases. For example, an organization's employee that primarily relied on the Internet to research suppliers' products, but recently started to use the Internet in order to contact with direct competitors of the organization may also be considered suspicious.

Further, the threat detection algorithm may compare a resource activity documented in an activity record with a historical and/or typical resource activity. For example, a sustained access to an LCS may be considered suspicious if the accessed LCS has historically been mostly idle. Other methods for performing threat detection may be implemented by the security manager without departing from the scope of the invention. Threat detection may, for example, involve a human operator, e.g., a security expert, performing a manual threat detection and/or a manual review of threats detected by the security manager.

In Step 324, the microvisor (or more specifically, e.g., the security manager) makes a determination as to whether any malicious activity (associated with the LCS) is detected in the analysis output (generated in Step 322). Accordingly, in one or more embodiments, if the result of the determination is YES, the method proceeds to Step 326. If the result of the determination is NO, the method alternatively proceeds to Step 330.

In one or more embodiments, while performing the determination, the security manager may use its "user risk model". For example, consider a scenario where User 2 has performed malicious activities on a sensitive asset that resides in the LCS (e.g., generating a data archive using the sensitive asset and deleting the archive afterwards, trying to transfer the sensitive asset to an unauthorized removable storage media, etc.). In this scenario, the security manager may identify User 2 as a "bad actor" and may tag, based on the user risk model, User 2 as a "high-risk" user (e.g., as a malicious insider, as a negligent insider, as a credential thief, etc.). For this reason, the analysis report may indicate malicious activities associated with the LCS (so that the LCS may be tracked over time for a better management).

In Step 326, as a result of the determination in Step 324 being YES and for a better device management, the microvisor (or more specifically, e.g., the security manager) takes one or more preventive (and proactive) actions (e.g., threat preventive actions or security measures recommended by the corresponding DLP policy (e.g., a deter policy, a disrupt policy, etc.)) to prevent the threat. In one or more embodiments, as soon as such malicious activity is detected on the LCS, the security manager takes an intrusive action and implements a high-level DLP policy (e.g., DLP policy-zero trust level 4) in order to disrupt the malicious and/or high-risk user of the LCS and to immediately suspend the LCS' communication with the components of the system (e.g., 100, FIG. 1) (e.g., immediately suspends the LCS' network access by deactivating the LCS' ports).

In Step 328, once the high-level security policy is implemented and the LCS' network access is suspended, the microvisor (or more specifically, e.g., the security manager) may initiate notification of the administrator/user about the completion of the implementation. The notification may be displayed on a GUI of, for example, the corresponding IHS. Thereafter, the security manager may store (temporarily or permanently) the reasons and outcomes of the implementation in storage/database.

In one or more embodiments, the method may end following Step 328.

In Step 330, as a result of the determination in Step 324 being NO, the microvisor (or more specifically, e.g., the security manager) maintains (or allows) the LCS' communication with one or more components of the system (e.g., maintains the LCS' network access).

Thereafter, the security manager may initiate notification of the administrator/user about a current state/status of the composed. The notification may be displayed on a GUI of, for example, the corresponding IHS. Thereafter, the security manager may store (temporarily or permanently) the reasons and outcomes of Step 330 in the storage/database.

In one or more embodiments, the method may end following Step 330.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a microvisor, comprising:
    issuing, by a microvisor application programming interface (API), an API call to a microvisor agent to obtain a configuration template (CT) required to provision a logically composed system (LCS) on a first information handling system (IHS);
    upon obtaining the CT and by the microvisor agent, sending the CT to a microvisor kernel via the microvisor API;
    provisioning, by the microvisor kernel, the LCS based on the CT;
    upon provisioning of the LCS and based on the microvisor kernel's request, initiating, by an LCS basic input/output system (BIOS) helper, a guest BIOS of the LCS;
    notifying, by the microvisor kernel and via a graphical user interface (GUI), an administrator about the provisioned LCS;
    after notifying the administrator:
        monitoring, by a security manager (SM), communication traffic of the LCS to obtain a first dataset;
        monitoring, by the SM, an activity performed on the LCS to obtain a second dataset;
        analyzing, by the SM, the first dataset and the second dataset to generate an analysis output;
        making, by the SM and based on the analysis output, a determination that the activity is a malicious activity; and
        implementing, by the SM and based on the determination, a high-level security policy to disrupt a malicious user of the LCS.

2. The method of claim 1, wherein the high-level security policy comprises suspending the LCS' communication a plurality of component of a system.

3. The method of claim 1, wherein the analysis output specifies that the malicious activity is a data exfiltration event that occurred when the malicious user attempted to transfer a sensitive asset to an unauthorized removable storage media.

4. The method of claim 1, wherein the analysis output specifies that the malicious activity is a data loss event that occurred when the malicious user attempted to upload a sensitive asset to an unauthorized file sharing website using an administrator credential.

5. The method of claim 1,
    wherein the microvisor agent obtains the CT from an orchestrator, wherein the orchestrator is external to the first IHS,
    wherein the CT specifies at least one hardware resource set, wherein the at least one hardware resource set comprises:
        a first hardware resource set of a second IHS;
        a second hardware resource set of a third IHS; and
        a third hardware resource set of an external resource, wherein the first IHS, the second IHS, and the third IHS are distinct devices operably connected to each other and the external resource over a network.

6. The method of claim 5, wherein the first hardware resource set specifies at least one selected from a group consisting of a minimum user count, a maximum user count, a central processing unit (CPU) count per-LCS, a speed select technology configuration, an LCS hardware virtualization configuration, and an LCS input/output memory management unit configuration.

7. The method of claim 5, wherein the second hardware resource set specifies at least one selected from a group consisting of a minimum user count, a maximum user count, a swap space configuration per-LCS, a reserved memory configuration, and a memory ballooning configuration.

8. The method of claim 5, wherein the third hardware resource set specifies at least one selected from a group consisting of a minimum user count, a maximum user count, a graphics processing unit (GPU) count per-LCS, a type of a GPU scheduling policy, and a type of a GPU virtualization approach that needs to be implemented.

9. The method of claim 5, wherein the first hardware resource set comprises hardware resources that are distinct from second hardware resources of the second hardware resource set.

10. The method of claim 1, wherein the microvisor is presented to the malicious user as the BIOS of the first IHS.

11. The method of claim 1,
wherein the microvisor API, the microvisor kernel, the LCS BIOS helper, and the security manager execute on the first IHS as ring −1 components,
wherein the microvisor agent executes on the first IHS as a ring 1 component,
wherein the ring −1 components have higher level privileges relative to the ring 1 components and a ring 0 component, and
wherein the higher level privileges comprise at least one selected from a group consisting of unrestricted access to memory to perform memory allocation, unrestricted access to input/output ports to send or receive network packets, an ability to handle a hardware interrupt, an ability to handle an application exception, and an ability to register an interrupt handler.

12. The method of claim 11, wherein the LCS comprises at least the guest BIOS, an LCS kernel, and an application,
wherein the guest BIOS and the LCS kernel execute as ring 0 components, and
wherein the application executes as a ring 1 component.

13. A method for managing a microvisor, comprising:
issuing, by a microvisor application programming interface (API), an API call to a microvisor agent to obtain a configuration template (CT) required to provision a logically composed system (LCS) on a first information handling system (IHS);
upon obtaining the CT and by the microvisor agent, sending the CT to a microvisor kernel via the microvisor API;
provisioning, by the microvisor kernel, the LCS based on the CT;
upon provisioning of the LCS and based on the microvisor kernel's request, initiating, by an LCS basic input/output system (BIOS) helper, a guest BIOS of the LCS;
notifying, by the microvisor kernel and via a graphical user interface (GUI), an administrator about the provisioned LCS;
after notifying the administrator:
monitoring, by a security manager (SM), communication traffic of the LCS to obtain a first dataset;
monitoring, by the SM, an activity performed on the LCS to obtain a second dataset;
analyzing, by the SM, the first dataset and the second dataset to generate an analysis output;
making, by the SM and based on the analysis output, a determination that the activity is a non-malicious activity; and
maintaining, by the SM and based on the determination, the communication traffic of the LCS.

14. The method of claim 13, wherein the first dataset specifies at least one selected from a group consisting of a type of a request, a response to the request, a type of the response, and a corresponding response time for the request.

15. The method of claim 13, wherein the second dataset specifies at least one selected from a group consisting of an identifier of an application, a user account used to access the application, and a file system path that stores a content of the application.

16. The method of claim 13,
wherein the microvisor agent obtains the CT from an orchestrator, wherein the orchestrator is external to the first IHS,
wherein the CT specifies at least one hardware resource set, wherein the at least one hardware resource set comprises:
a first hardware resource set of a second IHS;
a second hardware resource set of a third IHS; and
a third hardware resource set of an external resource,
wherein the first IHS, the second IHS, and the third IHS are distinct devices operably connected to each other and the external resource over a network.

17. The method of claim 16, wherein the first hardware resource set specifies at least one selected from a group consisting of a minimum user count, a maximum user count, a central processing unit (CPU) count per-LCS, a speed select technology configuration, an LCS hardware virtualization configuration, and an LCS input/output memory management unit configuration.

18. The method of claim 16, wherein the second hardware resource set specifies at least one selected from a group consisting of a minimum user count, a maximum user count, a swap space configuration per-LCS, a reserved memory configuration, and a memory ballooning configuration.

19. The method of claim 16, wherein the third hardware resource set specifies at least one selected from a group consisting of a minimum user count, a maximum user count, a graphics processing unit (GPU) count per-LCS, a type of a GPU scheduling policy, and a type of a GPU virtualization approach that needs to be implemented.

20. A method for managing a microvisor, comprising:
issuing, by a microvisor application programming interface (API), an API call to a microvisor agent to obtain a configuration template (CT) required to provision a logically composed system (LCS) on a first information handling system (IHS);
upon obtaining the CT and by the microvisor agent, sending the CT to a microvisor kernel via the microvisor API;
provisioning, by the microvisor kernel, the LCS based on the CT;
upon provisioning of the LCS and based on the microvisor kernel's request, initiating, by an LCS basic input/output system (BIOS) helper, a guest BIOS of the LCS;
notifying, by the microvisor kernel and via a graphical user interface (GUI), an administrator about the provisioned LCS;
after notifying the administrator:
monitoring, by a security manager (SM), communication traffic of the LCS;
analyzing, by the SM, the communication traffic to generate an analysis output;
making, by the SM and based on the analysis output, a determination that an activity is a malicious activity; and implementing, by the SM and based on the determination, a security policy to disrupt a malicious user of the LCS.

\* \* \* \* \*